US008504728B1

(12) United States Patent
Williams et al.

(10) Patent No.: US 8,504,728 B1
(45) Date of Patent: Aug. 6, 2013

(54) NETWORK INTERFACE WITH SECONDARY DATA AND PACKET INFORMATION STORAGE AND MEMORY CONTROL SYSTEMS TO ACCOMMODATE OUT-OF-ORDER DATA PROCESSING AND SPLIT TRANSACTIONS ON A HOST SYSTEM BUS

(75) Inventors: Robert Alan Williams, Cupertino, CA (US); Jeffrey Dwork, San Jose, CA (US); Chin-Wei Kate Liang, Eden Prairie, MN (US); Kevin Pond, legal representative, Eden Prairie, MN (US); Hung Duy Vo, San Jose, CA (US)

(73) Assignee: GlobalFoundries Inc., Grand Cayman (KY)

( * ) Notice: Subject to any disclaimer, the term of this patent is extended or adjusted under 35 U.S.C. 154(b) by 3051 days.

(21) Appl. No.: 10/890,649

(22) Filed: Jul. 14, 2004

Related U.S. Application Data

(60) Provisional application No. 60/517,639, filed on Nov. 5, 2003.

(51) Int. Cl.
*G06F 15/16* (2006.01)
*G06F 13/00* (2006.01)

(52) U.S. Cl.
USPC ............................................ 709/250; 710/52

(58) Field of Classification Search
USPC ............................................ 709/250; 710/52
See application file for complete search history.

(56) References Cited

U.S. PATENT DOCUMENTS

| | | | |
|---|---|---|---|
| 4,658,351 A | 4/1987 | Teng | |
| 5,043,981 A | 8/1991 | Firoozmand et al. | |
| 5,223,606 A | 6/1993 | Blaudin de The et al. | |
| 5,375,223 A | 12/1994 | Meyers et al. | |
| 5,502,719 A | 3/1996 | Grant et al. | |
| 5,513,320 A | 4/1996 | Young et al. | |
| 5,521,916 A | 5/1996 | Choudhury et al. | |
| 5,633,865 A | 5/1997 | Short | |
| 5,724,358 A | 3/1998 | Headrick | |
| 5,745,790 A | 4/1998 | Oskouy | |
| 5,805,816 A | 9/1998 | Picazo, Jr. et al. | |
| 5,812,774 A | 9/1998 | Kempf et al. | |
| 5,813,027 A | 9/1998 | Lahti et al. | |
| 5,828,901 A | 10/1998 | O'Toole et al. | |
| 5,852,719 A | 12/1998 | Fishler et al. | |
| 5,870,627 A | 2/1999 | O'Toole et al. | |
| 6,012,118 A * | 1/2000 | Jayakumar et al. | 710/107 |

(Continued)

OTHER PUBLICATIONS

"PCI-X Boosts Bus Bandwidth to 1 Gbps", Laverty Nwaekwe and Syeed Chowdbury, May 11, 2000, printed from the Internet at: www.ednmag.com, 6 pgs.

(Continued)

*Primary Examiner* — Jeffrey Nickerson
(74) *Attorney, Agent, or Firm* — Eschweiler & Associates, LLC

(57) ABSTRACT

A network interface system includes a memory system for managing data obtained via a system bus that supports split transactions. The memory system comprises a first memory for storing outgoing assembled data frames and associated control information prior to transfer of the outgoing data to the network, and an assembly memory that stores unassembled outgoing data from the bus. A memory control system stores the control information associated with pending bus read requests and also transfers outgoing data from the assembly memory to the first memory when all the outgoing data for a corresponding read request has been assembled.

10 Claims, 19 Drawing Sheets

U.S. PATENT DOCUMENTS

| | | | |
|---|---|---|---|
| 6,016,401 A * | 1/2000 | Rostoker et al. ................. | 712/29 |
| 6,049,842 A | 4/2000 | Garrett et al. | |
| 6,070,194 A | 5/2000 | Yu et al. | |
| 6,091,734 A | 7/2000 | Suzuki et al. | |
| 6,145,016 A | 11/2000 | Lai et al. | |
| 6,167,041 A | 12/2000 | Afanador | |
| 6,182,164 B1 | 1/2001 | Williams | |
| 6,182,165 B1 | 1/2001 | Spilo | |
| 6,199,124 B1 | 3/2001 | Ramakrishnan et al. | |
| 6,212,593 B1 | 4/2001 | Pham et al. | |
| 6,304,911 B1 | 10/2001 | Brcich et al. | |
| 6,324,595 B1 | 11/2001 | Tsai et al. | |
| 6,327,615 B1 | 12/2001 | Kasper | |
| 6,327,625 B1 * | 12/2001 | Wang et al. ................. | 709/235 |
| 6,334,162 B1 | 12/2001 | Garrett et al. | |
| 6,347,089 B1 | 2/2002 | Tsui et al. | |
| 6,401,145 B1 | 6/2002 | Baskey et al. | |
| 6,427,173 B1 | 7/2002 | Boucher et al. | |
| 6,515,993 B1 | 2/2003 | Williams et al. | |
| 6,529,945 B1 | 3/2003 | Calhoun et al. | |
| 6,570,876 B1 | 5/2003 | Aimoto | |
| 6,581,113 B1 | 6/2003 | Dwork et al. | |
| 6,671,274 B1 | 12/2003 | Ding et al. | |
| 6,732,209 B1 | 5/2004 | Cherukuri et al. | |
| 6,842,821 B2 | 1/2005 | Nystuen | |
| 6,891,835 B2 | 5/2005 | Kalkunte et al. | |
| 6,970,921 B1 | 11/2005 | Wang et al. | |
| 7,016,302 B1 | 3/2006 | Schramm et al. | |
| 7,047,531 B2 | 5/2006 | Dorland et al. | |
| 7,404,058 B2 * | 7/2008 | Lo et al. ........................ | 711/168 |
| 7,464,199 B2 * | 12/2008 | Bissessur et al. ............... | 710/22 |
| 7,487,304 B1 * | 2/2009 | Melvin ........................ | 711/154 |
| 2002/0009075 A1 | 1/2002 | Fesas, Jr. | |
| 2002/0013821 A1 | 1/2002 | Kasper | |
| 2002/0174255 A1 | 11/2002 | Hayter et al. | |
| 2002/0188742 A1 | 12/2002 | Nie | |
| 2002/0194415 A1 | 12/2002 | Lindsay et al. | |
| 2004/0193733 A1 | 9/2004 | Vangal et al. | |
| 2005/0213603 A1 | 9/2005 | Karighattam et al. | |

OTHER PUBLICATIONS

Office Action for U.S. Appl. No. 10/676,758 Mailed Feb. 22, 2008.
Office Action for U.S. Appl. No. 10/816,656 Mailed Nov. 15, 2007.
Response to Office Action for U.S. Appl. No. 10/816,656, filed Feb. 14, 2008.

* cited by examiner

NETWORK INTERFACE WITH SECONDARY DATA AND PACKET INFORMATION STORAGE AND MEMORY CONTROL SYSTEMS TO ACCOMMODATE OUT-OF-ORDER DATA PROCESSING AND SPLIT TRANSACTIONS ON A HOST SYSTEM BUS

RELATED APPLICATIONS

This application claims priority to and the benefit of the U.S. Provisional Application Ser. No. 60/517,639 filed Nov. 5, 2003, which is entitled "NETWORK INTERFACE SYSTEMS AND METHODS FOR OFFLOADING SEGMENTATION AND/OR CHECKSUMMING WITH SECURITY PROCESSING", the entirety of which is hereby incorporated by reference as if fully set forth herein.

This application is related to U.S. patent application Ser. No. 10/816,656, filed on Apr. 2, 2004 entitled LINK LIST FRAME BUFFER MANAGEMENT APPARATUS AND METHODS FOR STORING OUTGOING DATA IN A NETWORK INTERFACE, U.S. patent application Ser. No. 10/771,590, filed on Feb. 4, 2004, entitled DESCRIPTOR MANAGEMENT SYSTEMS AND METHODS FOR TRANSFERRING DATA OF MULTIPLE PRIORITIES BETWEEN A HOST AND A NETWORK, U.S. patent application Ser. No. 10/676,758, filed on Oct. 1, 2003, entitled PERIPHERAL DEVICES AND METHODS FOR TRANSFERRING INCOMING DATA STATUS ENTRIES FROM A PERIPHERAL TO A HOST, and is also related to U.S. patent application Ser. No. 10/676,759, filed on Oct. 1, 2003, entitled DESCRIPTOR MANAGEMENT SYSTEMS AND METHODS FOR TRANSFERRING DATA BETWEEN A HOST AND A PERIPHERAL, the entirety of these applications being hereby incorporated by reference as if fully set forth herein.

FIELD OF INVENTION

The invention is generally related to the field of computer devices and more particularly to methods and systems for interfacing a host device or system with a network.

BACKGROUND OF THE INVENTION

Host-computing systems, such as personal computers, are often operated as nodes on a communications network, where each node is capable of receiving data from the network and transmitting data to the network. Data is transferred over a network in groups or segments, wherein the organization and segmentation of data are dictated by a network operating system protocol. Many different protocols exist, and data segments which correspond to different protocols may even co-exist on the same communications network. In order for a node to receive and transmit information packets, the node is equipped with a peripheral network interface controller, which is responsible for transferring information between the communications network and the host system. For transmission, the host processor constructs data or information packets in accordance with a network operating system protocol and passes them to the network peripheral. In reception, the host processor retrieves and decodes packets received by the network peripheral. The host processor performs many of its transmission and reception functions in response to instructions from an interrupt service routine associated with the network peripheral. When a received packet requires processing, an interrupt may be issued to the host system by the network peripheral. The interrupt has traditionally been issued after either all of the bytes in a packet or some fixed number of bytes in the packet have been received by the network peripheral.

Many computer systems include a peripheral bus, such as a peripheral component interconnect (PCI or PCI-X) bus for exchanging data between the host processor and high throughput devices, such as memory, network interfaces, display, and disk drives. The host processor and memory can be directly or indirectly connected to the PCI bus along with other devices, such as graphic display adapters, disk controllers, sound cards, etc., where such devices may be coupled directly or indirectly (e.g., through a host bridge) to the PCI or PCI-X bus. In other configurations, the peripheral systems and the main host system memory are connected to the PCI-X bus, wherein a peripheral system may operate as PCI-X bus master capable of direct memory access (DMA) operations to transfer data to and from the host memory. The host processor typically interacts with the PCI-X bus and main host system memory via a memory controller, and the host system may further include a cache memory for use by the host processor.

The PCI-X host bus architecture provides several performance advantages over conventional PCI systems, such as increased operating frequency (e.g., 33 to 133 MHz) and improved maximum peak bandwidth. One important performance enhancing feature of the PCI-X architecture is the addition of split transactions, which may be used in transferring data across the PCI-X host bus between the host and the network controller. Split transactions replace the delayed transactions of PCI architectures, in which the target device terminated the transfer with a retry and fetches the data from memory. The initiator then retried the transaction at a later time, and the target would then hopefully complete the transfer if the data was then ready. These PCI delayed transactions essentially forced the transaction initiator to repeatedly retry the transaction until the target obtained the data, resulting in significantly reduced system bandwidth. However, conventional network controllers designed for PCI operation do not support this type of split transaction, and accordingly cannot realize all the performance advantages of the PCI-X standard increase system throughput. Accordingly, there remains a need for improved data transfer methods and systems to facilitate improved performance in transferring data between a host computer and a network controller.

SUMMARY OF THE INVENTION

The following presents a simplified summary of the present invention in order to provide a basic understanding of some aspects of the invention. This summary is not an extensive overview of the invention. It is intended neither to identify key or critical elements of the invention nor to delineate the scope of the invention. Rather, the primary purpose of this summary is to present some concepts of the invention in a simplified form as a prelude to the more detailed description that is presented later.

The present invention provides network interface systems or network controllers that facilitate transfer of outgoing (e.g., transmit) data from a host system to a network where the network interface and host communicate across a PCI-X or other host bus that supports split transactions. The invention allows the network interface system to request transmit data from the host system (e.g., via a PCI-X read request transaction), and to buffer data from split responses in an assembly memory and even to issue further read requests (e.g., up to 32 pending requests in one implementation), while awaiting completion of the requests. Once all the data from a particular response has been assembled, the assembled data frames are transferred to a transmit memory, after which the frames can be transmitted with or without encryption or other intermediate processing in the network controller.

In one aspect of the invention, a network interface system is provided for interfacing a host system with a network. The network interface system comprises a bus interface as well as memory system for storing outgoing data prior to transmission to the network. The memory system comprises a first memory (e.g., such as a transmit FIFO) for storing assembled outgoing data frames from completed host bus read request transactions and associated control information, as well as an assembly memory (e.g., an assembly RAM) that stores unassembled outgoing data from the bus interface system. The memory system further comprises a memory control system that stores the control information associated with outgoing data associated with incomplete or pending read requests. The memory control system transfers outgoing data from the assembly memory and associated control information to the first memory when all the outgoing data for a corresponding read request has been assembled in the assembly memory. The network interface system may further comprise a descriptor management system to provide the control information to the memory system and a security system for performing security processing (e.g., encryption, authentication, etc.) on the outgoing data prior to transmission to the network.

To the accomplishment of the foregoing and related ends, the following description and annexed drawings set forth in detail certain illustrative aspects and implementations of the invention. These are indicative of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1A:
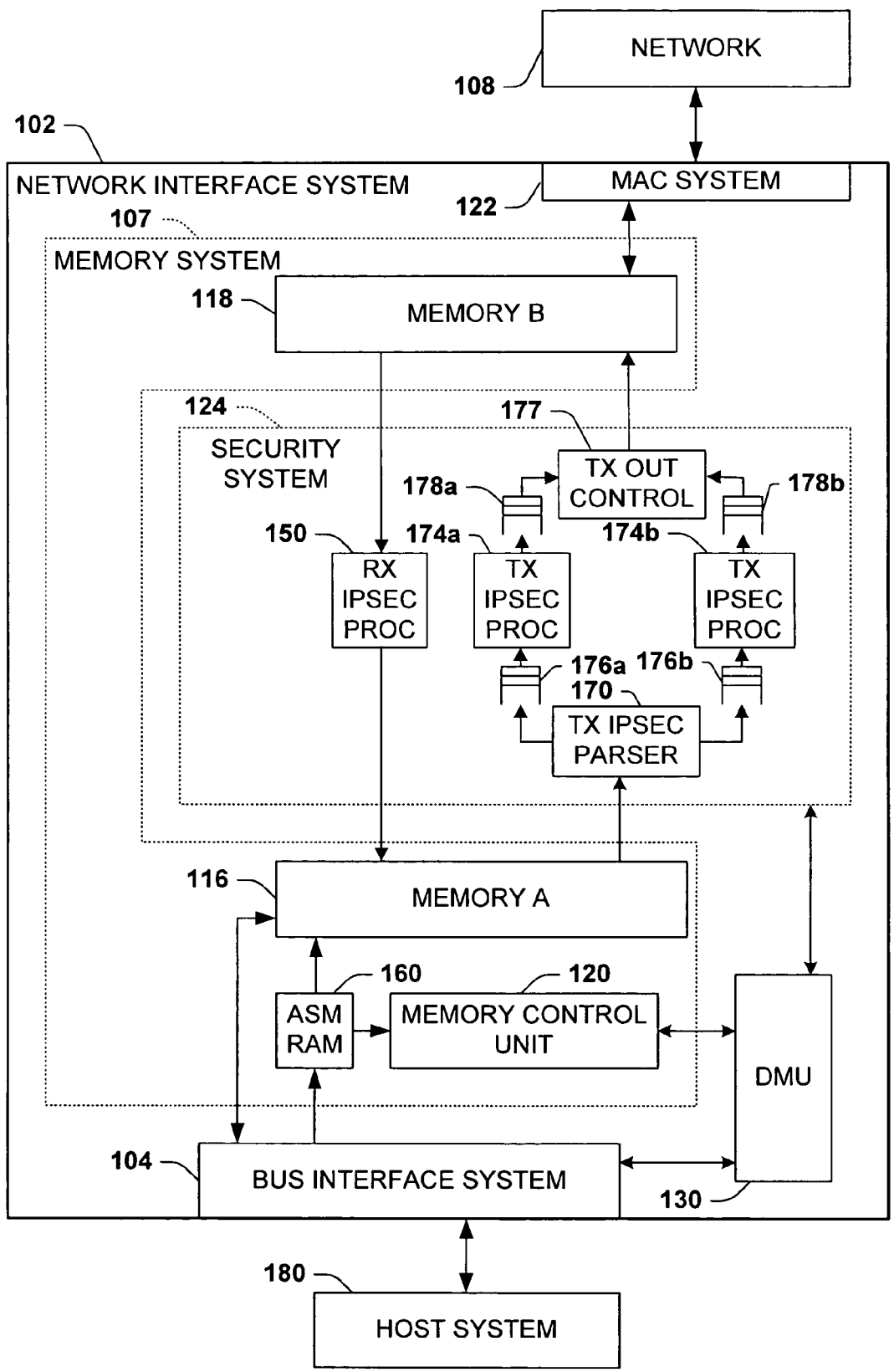
FIG. 1A is a schematic diagram illustrating an exemplary network interface system having a memory system including a first memory, and assembly memory, and a memory control system for storing outgoing data from a host prior to security processing in accordance with one or more aspects of the present invention.

One or more implementations of the present invention will now be described with reference to the drawings, wherein like reference numerals are used to refer to like elements throughout.

FIG. 1A illustrates an exemplary network interface system or network controller 102 for interfacing a host system 180 with a network 108, which employs a memory system 107 to facilitate obtaining data across a host bus using split transactions in accordance with the invention. The network interface system 102 transfers outgoing (e.g., transmit) data from the host 180 to the network 108 and also transfers incoming (e.g., receive) data from the network 108 to the host 180, with security processing capabilities provided by a security system 124 for both incoming and outgoing data. The interface 102 comprises a bus interface system 104 which can be operatively coupled with the host 180, such as via a PCI-X bus in the host system (e.g., bus 106 in FIGS. 1B, 1I, and 2 below), where the bus interface system 104 is adapted to transfer data between the network interface system 102 and the host system 180. A media access control (MAC) system 122 in the network interface 102 may be operatively coupled with the network 108, such as via a media independent interface (e.g., MII, GMII, etc.) compliant transceiver (not shown), wherein the MAC system 122 is operable to transfer data between the network interface system 102 and the network 108. The bus interface system 104, the MAC system 122, and the security system 124 may be constructed using any electrical circuitry or components configured or configurable to transfer data to and from the network interface system 102 and to provide security processing functions (e.g., encryption, decryption, authentication, etc.). In particular, the systems 104, 122, and 124 may comprise any combination of hardware such as logic devices, analog circuits, electrical connectors, etc., which may be programmable or configurable by software and/or firmware in the network interface system 102.

The network interface system 102 further comprises a memory system 107 coupled with the bus interface system 104, the security system 124, and the MAC system 122, for storage of incoming and outgoing data being transferred between the hot system 180 and the network 108. The exemplary memory system 107 comprises a first memory 116 configured as a 32K FIFO memory (e.g., MEMORY A 116 operating as a transmit FIFO with respect to outgoing data), and a second MEMORY B 118 situated between the security system 124 and the MAC system 122. The first memory 116 is coupled with the bus interface system 104, and the security system 124 for storage of outgoing data prior to security processing as well as for storing incoming (e.g., receive) data after security processing. The second memory 118 is coupled with the MAC system 122 and the security system 124 for storage of incoming data prior to security processing and for storage of outgoing data after security processing.

As illustrated in FIG. 1A, the memory system 107 and the first and second memories 116 and 118 thereof may be any form of memory circuitry, volatile or non-volatile, including but not limited to random access memory (RAM) circuitry with appropriate control circuitry. Although illustrated as first and second memories 116 and 118, respectively, the memory system 107 may be separate memories or a unitary memory system partitioned into first and second memory areas 116 and 118, respectively. Furthermore, one or both of the memories 116 and 118 may comprise separate memory circuitry for handling incoming and outgoing data, or alternatively may be single memory circuits partitioned (e.g., statically or dynamically) for storage of incoming and outgoing data and control information. In this regard, a 32K memory A 116 is discussed below where 512 blocks of 64 bytes are described as available for storing outgoing data for purposes of illustration. However, the sizes of the memory A 116, the number and size of the blocks therein, and the number of blocks allocated (e.g., statically or dynamically) for outgoing data storage are not critical to the invention and the appended claims.

In accordance with the present invention, the memory system 107 further comprises an assembly memory 160 (e.g., an assembly RAM) coupled with the bus interface 104 and the first memory 116 for assembling requested transmit data frames from the host 180, as well as a memory control unit or system 120 coupled with the first memory 116, the assembly memory 160, and the bus interface system. The assembly memory 160 operates to store unassembled outgoing data from the bus interface 104. The memory control system 120 stores control information associated with outgoing data for which read requests have been generated but are not yet completed, and also transfers outgoing data from the assembly memory and the associated control information to the first memory 116 when all the outgoing data for a corresponding read request has been assembled in the assembly memory 160.

The exemplary network interface system 102 further comprises a descriptor management system or unit (e.g., DMU) 130 coupled with the bus interface system 104, the memory system 107, and the security system 124. The descriptor management system 130 is adapted to obtain quality of service (QOS) or priority information from the host system 180 and to provide the priority information to the memory system 107, thereby facilitating prioritized processing and transfer of outgoing data in the network interface system 102. The descriptor management system 130 provides the control information associated with outgoing data to the memory control system 107. The systems 104, 122, 107, 124, and 130 in the network interface system 102 may optionally be configurable or programmable via software and/or firmware. For example, one, some, or all of the systems 104, 122, 107, 124, and 130 of the network interface 102 may be configured by software in the host system 180 and/or via firmware such as a coded EEPROM in the system 102 or an external EEPROM or other memory device external to the system 102 via an EEPROM interface (e.g. interface 114 in FIG. 3 below). The various systems 104, 122, 107, 124, and 130, moreover, may be selectively operable according to control or other type information obtained from the host system 180, wherein such information may be associated with one or more data frames or groupings being processed and/or transferred between the host system 180 and the network 108. In this regard, the network interface system 102 and the descriptor management system 130 thereof may obtain outgoing data priority (QOS) information and other control information from the host system 180 related to an outgoing data frame to be transmitted to the network 108 through transmit descriptors 192a read by the descriptor system 130, as illustrated and described further below. Further, the systems 104, 122, 107, 124, and 130 may provide control, status, or other types of information to the host system 180.

The security system 124 is configured or configurable to selectively perform security processing for incoming and/or outgoing data in the network interface system 102, including encryption, decryption, and authentication functions. In particular, the security system 124 operates to selectively encrypt the assembled outgoing after it is stored in the first memory 116 prior being transferred to the second memory 118 and ultimately to the network 108. The security system 124, may be constructed using any suitable electronic devices, such as analog and logic circuitry, configured or configurable to perform security processing for incoming and/or outgoing data in the interface system 102. In the illustrated implementation, the security system 124 is an IPsec system adapted to selectively provide authentication, encryption, and decryption functions for incoming and outgoing data, although other forms of security systems and other types of security processing are contemplated within the scope of the invention.

The exemplary security processing system 124 comprises a receive IPsec processor 150, a transmit IPsec transmit IPSEC parser 170, two transmit IPsec security processors 174a and 174b with corresponding input buffers 176a and 176b and output buffers 178a and 178b, and a transmit IPsec output data flow controller 177. In operation, outgoing (e.g., transmit) data is transferred from the bus interface 104 to the assembly memory 160. Once the outgoing data is assembled in the assembly memory 160, the assembled data is transferred in blocks or packets (e.g., 64 byte blocks), together with associated control information, into the first memory 116 by the memory control system 120. The assembled outgoing data is then unloaded from the first memory 116 and transferred to the transmit IPSEC parser 170.

The transmit IPSEC parser 170 obtains the outgoing data (e.g., blocks) from the memory 116 and sends data packets alternately to the input buffers (e.g., FIFOs) 176a and 176b. The transmit IPsec processors 174a and 174b, operating essentially in parallel, read data from their corresponding input buffers 176a and 176b, perform security processing on the data, and write the processed data to their corresponding output buffers 178a and 178b. The output flow controller 177 reads the processed data alternately from the output buffers 178a and 178b and writes the processed data to the second memory 118 with the packets in the same order as the order in which they were read from the first memory 116. The input buffers 176b and 176a and the output buffers 178b and 178a of FIG. 1A can be of any suitable size and configuration. For example, the buffers can be from about 32 bytes to about 1024 bytes, with 256 bytes being a preferred size. They can be two separate memories, or a single partitioned memory. Preferably, the buffers 176, 178 are of sufficient size whereby when the network interface system 102 is transmitting a series of short data packets for which the overhead in IPsec processing is significant, the transmit IPsec processors 174b and 174a both remain in continuous operation.

The exemplary IPsec processors 174 individually comprise a transmit security processing control module, an ESP authentication system, an authentication header (AH) system, and an ESP encryption system. The transmit security processing control module selectively directs data packets from the input buffer 176a through none, one, or more of the ESP authentication system, the AH authentication system, and the ESP encryption system. Where encryption and authentication are required, the output of the ESP encryption system is routed to one or more of the authentication systems. The exemplary IPsec processor 174 can carry out both ESP and AH authentication on a packet and when performing both carries out the operations in parallel. Once processing is complete, the processed outgoing data is placed in the corresponding output buffer 178.

Figure 1B:
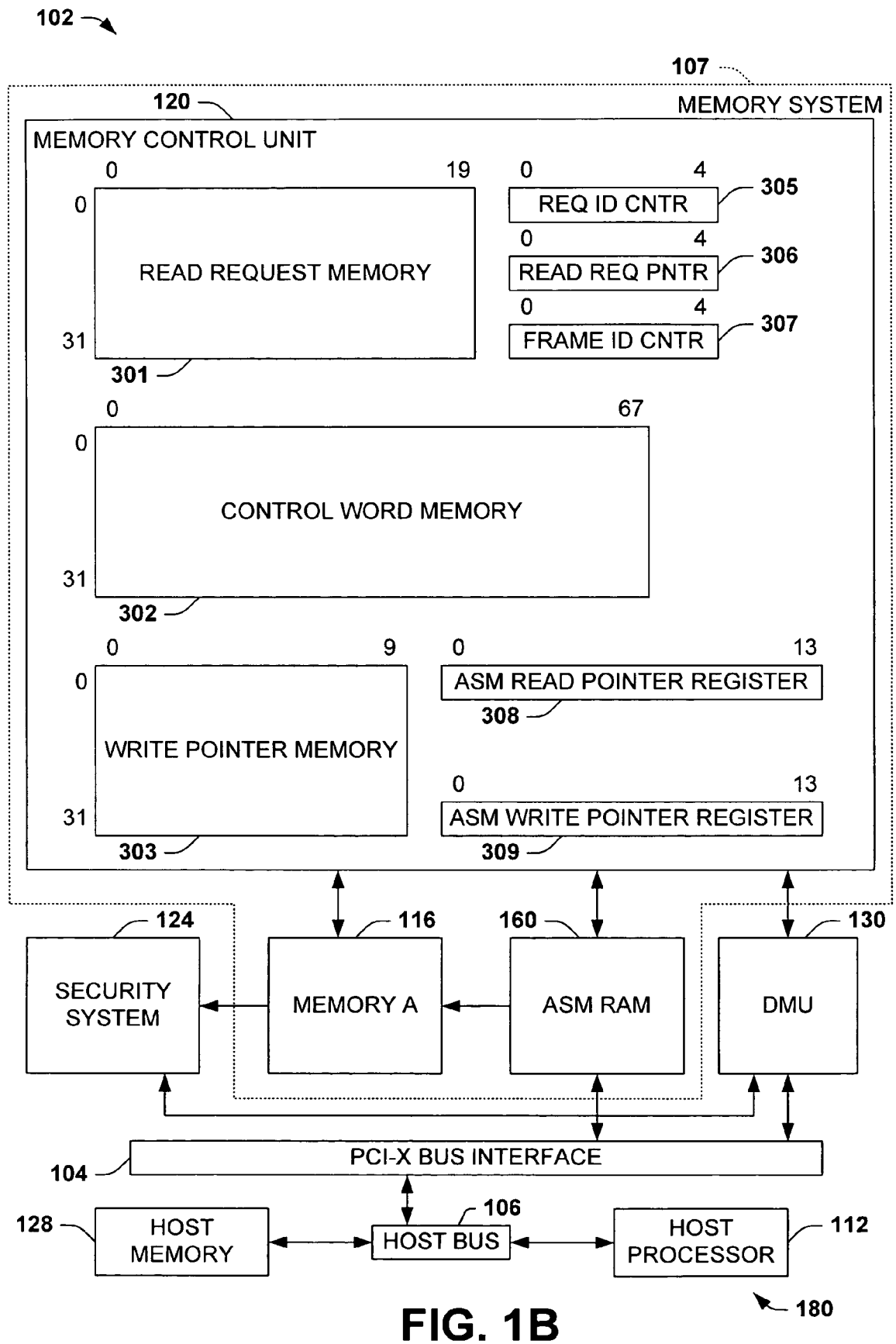
FIG. 1B is a schematic diagram illustrating further details of the exemplary memory system and memory control system of FIG. 1A.
Figure 1C:
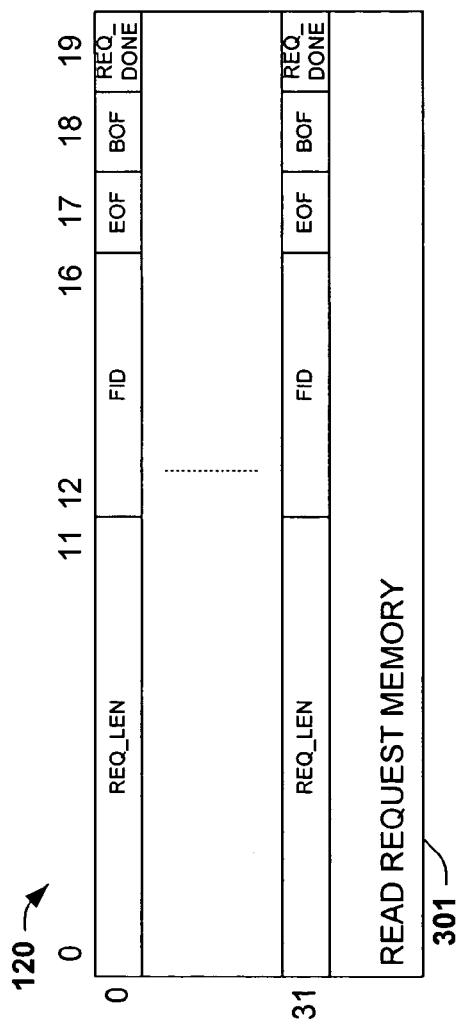
FIG. 1C is a schematic diagram illustrating an exemplary read request memory and entries thereof in the network interface system of FIGS. 1A and 1B.
Figure 1D:
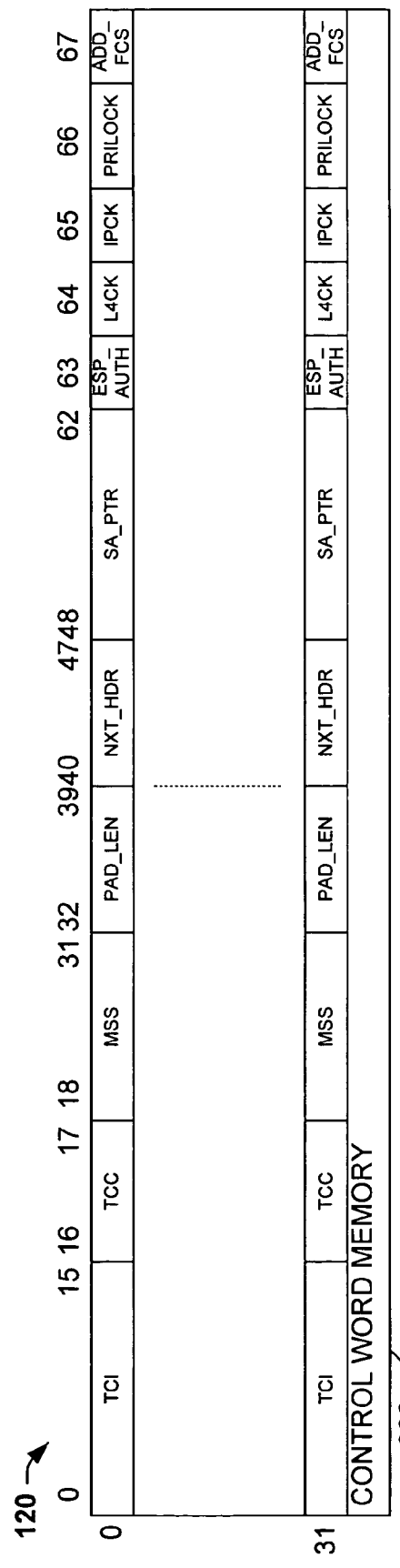
FIG. 1D is a schematic diagram illustrating an exemplary control word memory and entries thereof in the network interface system of FIGS. 1A-1C.

Referring also to FIGS. 1B-1D, FIG. 1B illustrates further details of the exemplary memory system 107 and the memory control system 120 in the network interface system 102. The memory control system 120 may be constructed using any electrical circuitry or components configured or configurable to store control information associated with outgoing data for which read requests have been generated but are not yet completed, and to control the transfer of assembled outgoing data frames from the assembly memory 160 and associated control information to the first memory 116 when all the outgoing data for a corresponding read request has been assembled in the assembly memory 160. In this regard, the system 120 may comprise any combination of hardware such as logic devices, analog circuits, electrical connectors, etc., which may be programmable or configurable by software and/or firmware in the network interface system 102.

The exemplary memory control system comprises a 20×32 bit read request memory 301, a 68×32 bit control word memory 302, and a 10×32 bit write pointer memory 303. The read request memory 301 stores request information associated with outstanding or pending read requests for outgoing (transmit) data from the host system 180, and the control word memory 302 stores the control information associated with the outgoing data for which read requests have been generated across the host bus 106 but are not yet completed (e.g., for the unassembled data). The write pointer memory 303 stores write pointer address values indicating addresses in the assembly memory 160 to which outgoing data received from the host system 180 is to be written.

In addition, the exemplary memory control system 120 comprises an assembly memory write pointer register 309 that stores an address in the assembly memory 160 to which a next word of outgoing data is to be transferred from the host system 180, and an assembly memory read pointer register 308 that stores an address in the assembly memory 160 from which a next word of outgoing data is to be retrieved for transfer to the first memory 116, as well as a request ID counter 305, a read request pointer 306, and a frame ID counter 307. The frame ID counter 307 is used for assigning frame IDs to outgoing data frames being obtained from the host system 180, the request ID counter 305 is used for assigning a request ID to read requests generated by the bus interface system 104, and the read request pointer 306 stores an address in the read request memory 301 of the oldest read request that has not been completed.

In operation, the network interface system 102 requests outgoing data from the host system 180 using read requests generated by the bus interface system 104 on the host bus 106. The network interface system 102 and the host system 180 implement a descriptor system in which a software driver running in the host processor 112 (e.g., network driver software 190 in FIG. 4 below) stores outgoing data frames in the host system memory 128, and provides transmit descriptors (e.g., descriptors 192a of FIG. 5E below) to the network controller 102, including priority and control information associated with the outgoing data frames. The network interface system 102 services the transmit descriptors 192a in prioritized fashion, and generates appropriate read requests to obtain the data from the host memory 128. When all of the outgoing data associated with a particular read request have been received in the assembly memory 160 from the host system 180, the data and associated control information are transferred to the first memory 116. However, in PCI-X or other host bus systems in which split responses are possible, the network interface system 102 maintains the unassembled outgoing data in the assembly memory 160 until the response is completed, and may generate further read requests upon learning that a particular request is pending (e.g., upon receiving a split response from the host system 180). In the exemplary system 102, up to 32 such read requests can be pending at any given time.

FIG. 1C illustrates the exemplary read request memory 301 and entries thereof in the exemplary memory control system 120. For each of 32 possible outstanding read requests the read request memory 301 stores a 12-bit request length REQ_LEN indicating the number of bytes to be transferred by the read request operation, a frame ID storing a frame sequence number assigned by the memory control system 120 that is used to retrieve descriptor information when the beginning of the frame is ready to be pushed into the first memory 116, an end of frame bit EOF and a beginning of frame bit BOF indicating whether the requested outgoing data contains the end or beginning of a frame, respectively, and a request done bit REQ_DONE, which is set when the corresponding read request has been completed and all requested data have been stored in the assembly memory 160. The read request memory 301 is addressed by a 5-bit request ID (RID) number that the memory control system 120 generates for each read request, wherein the bus interface system 104 sets the TAG field of the Attributes phase of the PCI-X read transaction to the value of the RID number of the request. In this manner, when requested data is received from the host system 180, the TAG field of the response will indicate the request with which the received data is associated.

FIG. 1D illustrates the exemplary control word memory 302 and entries thereof, including control information that is read from the transmit descriptor 192*a* associated with the frame data being requested, where the 32-entry memory 302 is addressed by a 5-bit frame ID (FID). Each 68-bit entry in the memory 302 includes a 16-bit tag control information field TCI, a 2-bit tag control command TCC, a 14-bit maximum segment size field MSS, an 8-bit ESP pad length field PAD_LEN, an 8-bit ESP next header field NXT_HDR, a 15-bit security association pointer SA_PTR, as well as ESP_AUTH, L4CK, IPCK, PRILOCK, ADD_FCS control bits from descriptor 192*a*. In addition, the 32-entry write pointer memory 302 is maintained in the control system 120 to map transaction TAGs to locations in the assembly memory 160.

Referring also to FIGS. 1E-1H, the descriptor management system 130 determines the next transmit descriptor 192*a* to be serviced, for example, based on quality of service priority information. The information from the selected transmit descriptor 192*a* is provided by the descriptor management system 130 to the memory system 107. The memory system 107 and the bus interface system 104 cooperatively interact to service the transmit descriptors by generating appropriate read requests on the host bus 106, storing associated control information and unassembled frame data, and transferring assembled frames and the control information to the first memory 116. The memory control system 120 maintains the 14-bit pointers 308 and 309, wherein the read pointer 308 indicates the assembly memory address from which the next word of frame data will be retrieved for insertion into the first memory 116, and the write pointer 309 indicates the starting address of the assembly memory block into which the data from the next read request will be transferred. When the memory control system 120 issues a read request to the bus interface system 104, it provides the contents of the write pointer 309 to the bus interface 104, which in turn uses this pointer to move the frame data into the assembly memory 160. After issuing the read request, the memory control system 120 updates the write pointer 309 based on the number of bytes of data that were requested.

Through operation of the prioritized descriptor processing, the network interface system 102 initiates the read requests for outgoing data in the order that the data will be transmitted to the network. In addition, all read requests for data associated with a particular frame are issued before the first request for the following frame is issued. The exemplary memory control system 120 reads the assembled outgoing data from the assembly memory 160 in the order that the data will be transmitted, with the oldest data being read first. The system 120 maintains the start of the oldest data of the assembly memory 160 in the read pointer 308 and the next available location in the assembly memory 160 following the end of the newest data in the write pointer 309.

Figure 1E:
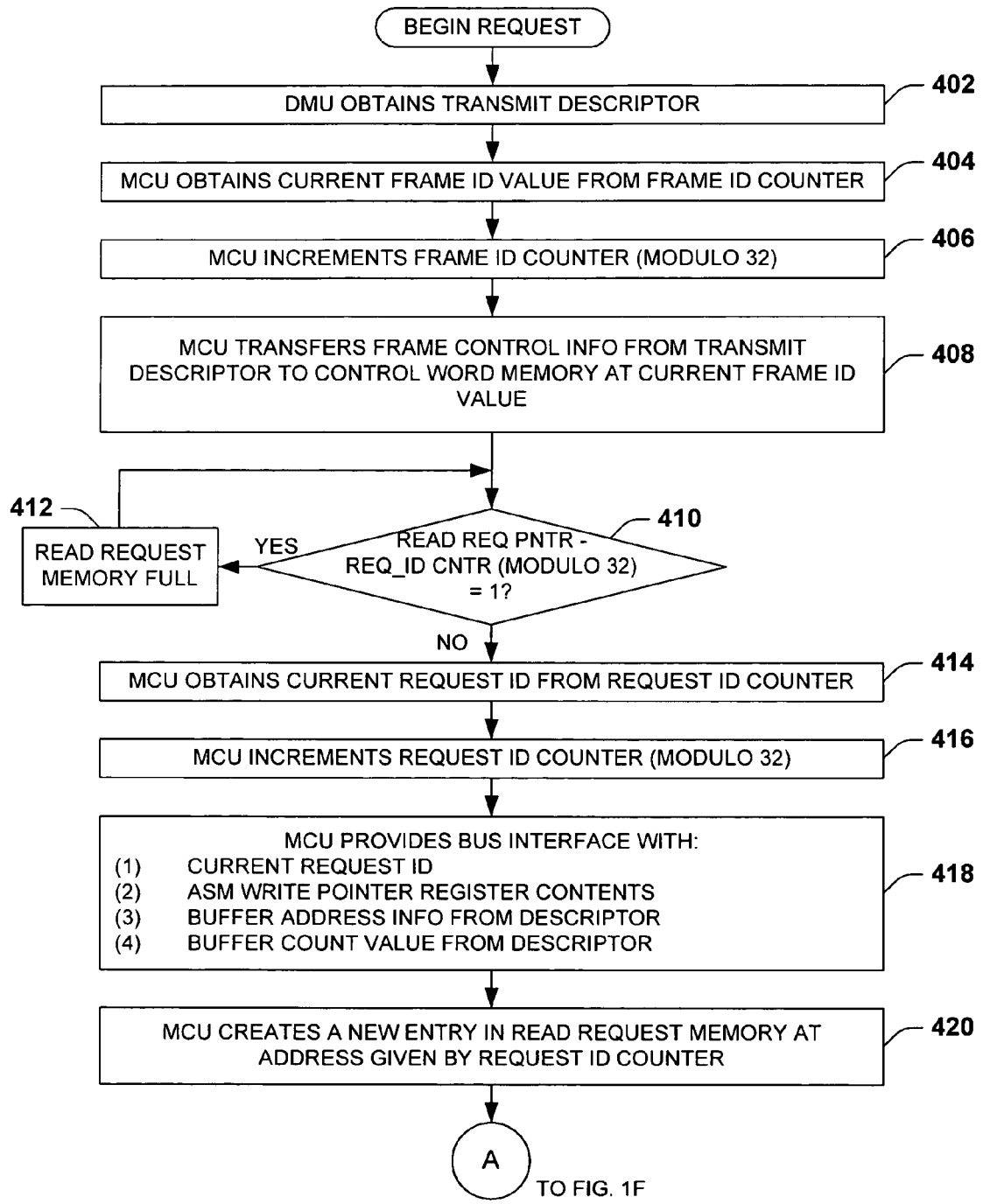
FIGS. 1E and 1F depict a flow diagram illustrating various operations in the network interface system to initiate a read request to obtain outgoing (e.g., transmit) data from the host system across the host but in accordance with the invention.
Figure 1F:
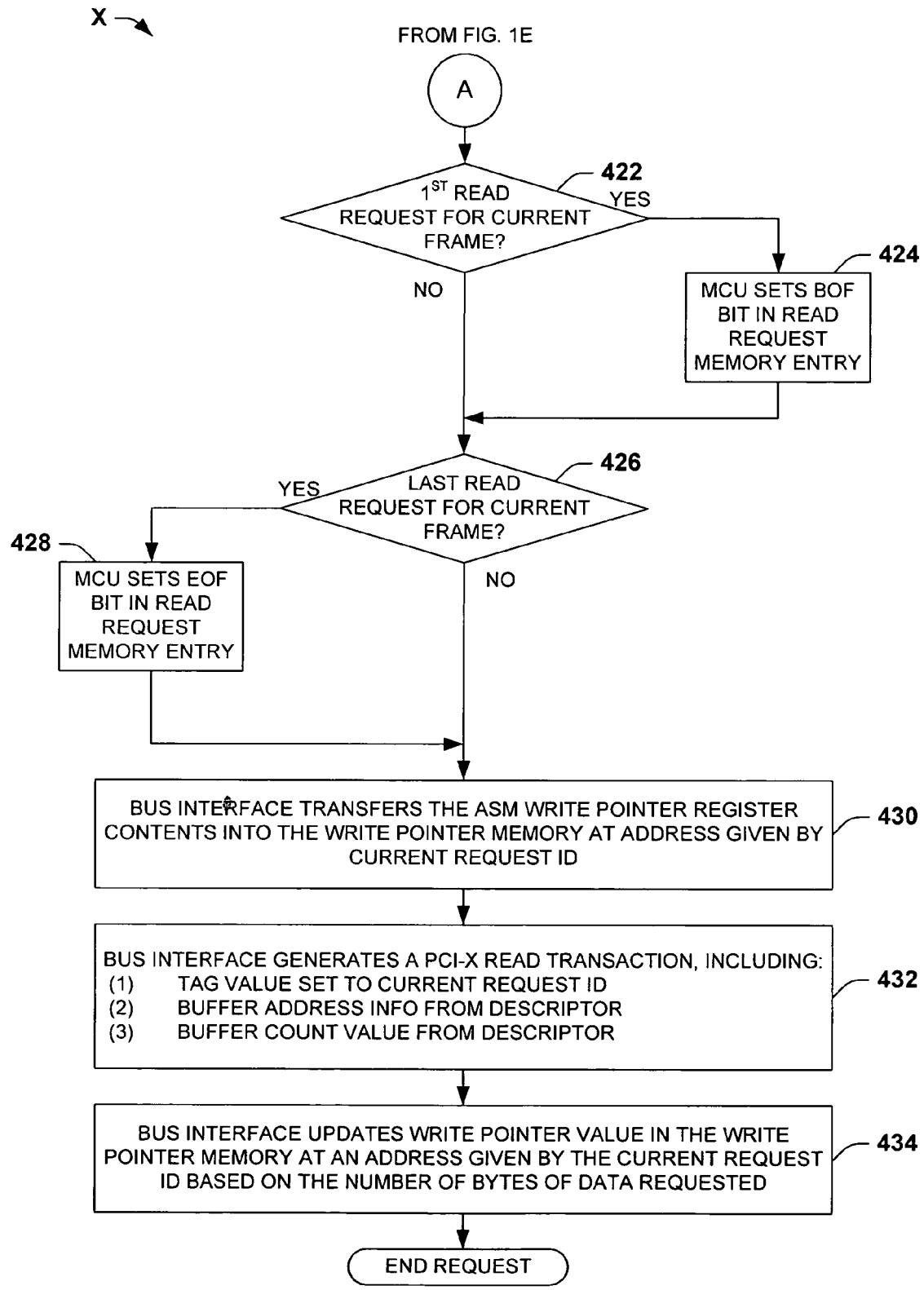
Figure 1G:
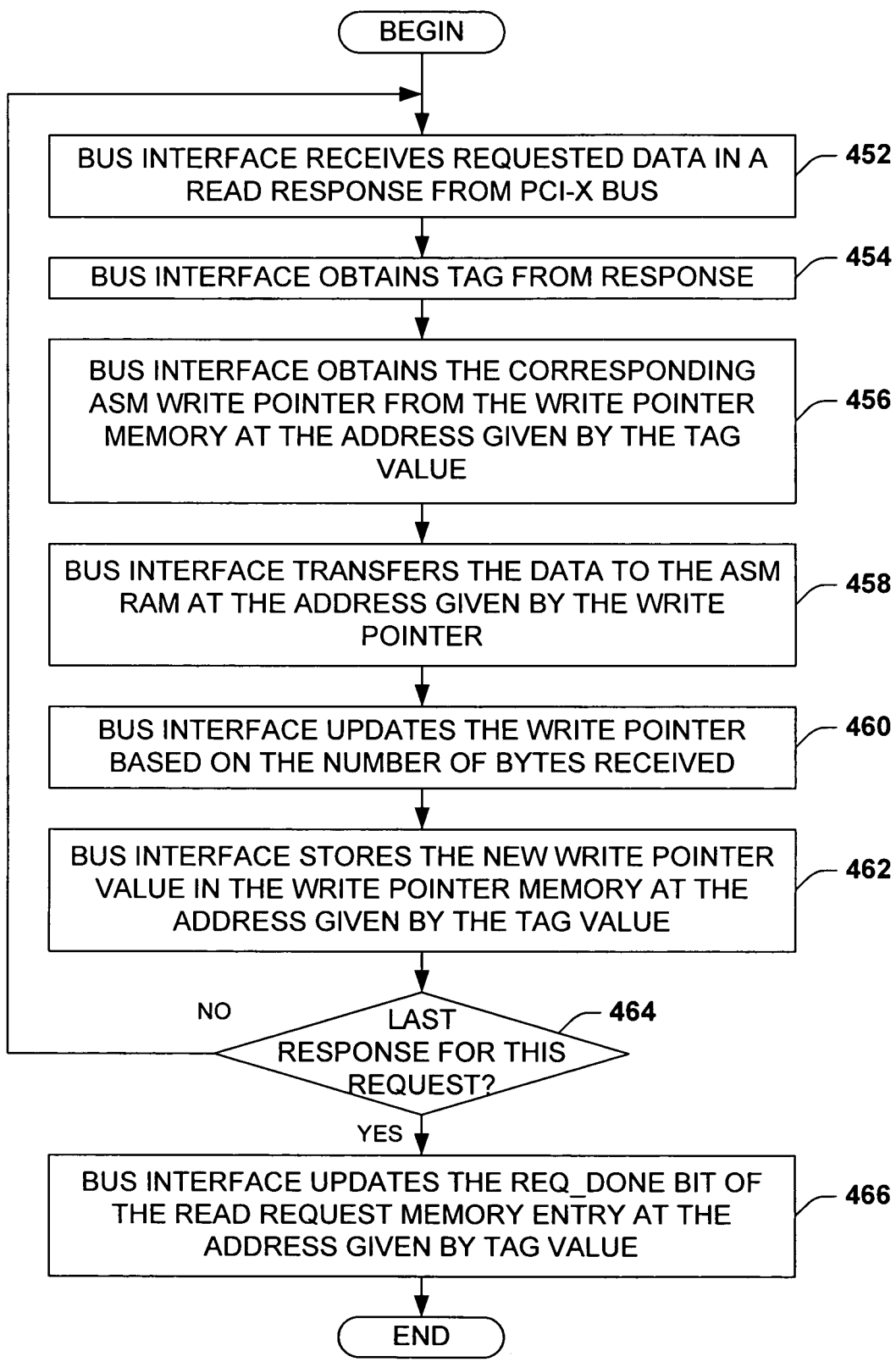
FIG. 1G is a flow diagram illustrating various operations in the network interface system to receive requested outgoing data from the host bus in accordance with the invention.
Figure 1H:
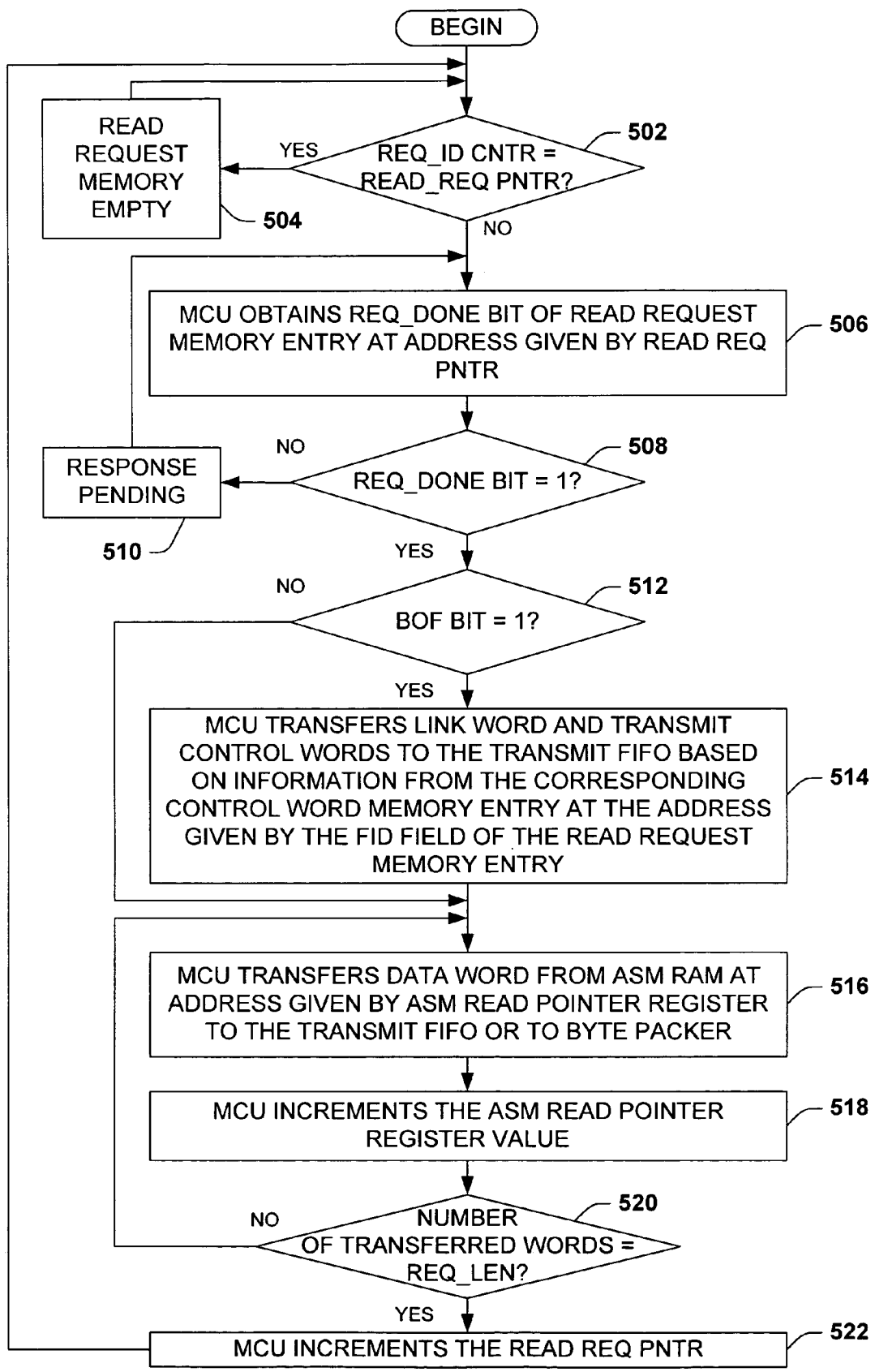
FIG. 1H is a flow diagram illustrating various operations in the network interface system to transfer assembled outgoing data frames and associated control information to the first memory in accordance with the invention.

FIGS. 1E and 1F illustrate initiation of a read request to obtain outgoing (e.g., transmit) data from the host system 180, FIG. 1G illustrates receipt and storage of requested outgoing data from the host bus 106, and FIG. 1H illustrates the transfer of assembled outgoing data frames and associated control information to the first memory 116 in accordance with the invention.

To initiate a read request in FIGS. 1E and 1F, the descriptor management system 130 obtains a transmit descriptor 192*a* at 402, and the memory control system (MCU) 120 obtains a current frame ID value from the frame ID counter at 404. The memory control system 120 then increments the frame ID counter at 406 using modulo 32 mathematics, and transfers the associated frame control information to the control word memory at 408 at an address given by the current frame ID value.

A determination is made at 410 by the memory control system 120 as to whether the read request memory is currently full. In the illustrated example, the memory control system 120 operates the read request memory 301 as a FIFO, and maintains the 5-bit read request pointer 306 that points to the entry in the memory 301 for the oldest request that has not been completed. The request ID counter 305 operates essentially as a write pointer, in that when the read request pointer value is equal to the current value the request ID counter, all requests have been completed, and the memory 301 is considered to be empty. When the request ID counter value is one less than the read request pointer 306 (modulo 32), the memory 301 is considered full at 412 (e.g., "YES" at 410, thus indicating 32 requests are pending), and no more read requests can be made until the oldest request has completed.

If a read request memory entry is available ("NO" at 410), the memory control system 120 obtains a current request ID value at 414 from the request ID counter 305, and then increments the request ID counter 305 at 416 using modulo 32 mathematics. The current request ID value (e.g., the value prior to the counter 305 being incremented) can be stored locally in the memory control system, for example, using a 5-bit latch (not shown) or other means prior to being incremented at 416. At 418, the control system 120 provides the current request ID value to the bus interface system, together with the assembly memory write pointer value, and buffer address and buffer count values from the transmit descriptor 192*a* (e.g., BYTECOUNT and BUF_ADR information as illustrated and described in conjunction with FIG. 5E below). At 420, the memory control system 120 creates a new entry in the read request memory 301 at an address given by the request ID, that includes the length of the read request in bytes and the current contents of the frame ID counter 307.

Referring also to FIG. 1F, if the current read request is to be the first request for the current frame ("YES" at 422), the BOF (beginning of frame) bit is set at 424 in the entry to the read request memory 301. If this is the last request for the frame ("NO" at 426), the EOF (end or frame) bit is set at 428, and the REQ_DONE bit is cleared. At 430, the bus interface system 104 transfers the contents of the assembly memory write pointer register 309 to the write pointer memory 303 at an address given by the request ID. At 432, the bus interface system 104 transfers the contents of the write pointer 309 to the write pointer memory 303 at an entry address given by the request ID, and generates a host bus read request at 432, wherein the request ID is used as a tag value in the read request, along with the buffer address and buffer count information that originated in the associated transmit descriptor 192*a*. At 434, the bus interface system 104 updates (e.g., increments) the value in the assembly memory write pointer register 309 based on the number of bytes of outgoing data requested to complete the read request.

In FIG. 1G, the bus interface system 104 receives requested data from the host bus 106 at 452, and obtains the value of the TAG field from the response at 454. In this regard, the target of the initial read requests (e.g., the host system 180) was given the request ID in the read request (e.g., at 432 in FIG. 1F), wherein the TAG used in the response will also include this request ID value, allowing the network interface system 102 to associate the response data with the appropriate request. At 456, the bus interface system 104 uses the TAG field value to address the write pointer memory 303 by reading the entry of the write pointer memory 303 at an address given by a tag value from the read response. The bus interface system 104 then transfers the received outgoing data at 458 to the assembly memory 160 beginning at an address given by the write pointer, and updates write pointer value in the write pointer memory 303 at 460 and 462 by the number of bytes received. It is noted that this provides a mechanism for handling requested data that may be provided by the host system 180 in more than one PCI-X split completions, even where the data is provided in a different order than the order in which it was requested. Once the last response has been processed for a given read request ("YES" at 464), the bus interface system 104 sets the REQ_DONE bit of the corresponding entry in the read request memory 301 at 466.

Referring also to FIG. 1H, the memory control system 120 monitors the status of the request indicated by the value of the read request pointer 306. When this request has been completed (e.g., all the associated outgoing data has been assembled in the assembly memory 160), the data and associated control information are transferred by the memory control system 120 to the transmit FIFO portion of the partitioned first memory 116. In the illustrated example, the oldest request in the read request memory 301 is checked and the corresponding assembled data is removed to the first memory 116 before checking other outstanding requests, such that the transfer of assembled data to the transmit FIFO first memory 116 is in the same order as it was requested, and hence in the order determined according to the priority scheme implementing the servicing of the transmit descriptors 192a.

Toward that end, the memory control system 120 determines at 502 and 504 whether the read request memory 301 is empty (e.g., whether the values of the request ID counter 305 and the read request pointer 306 are equal at 502). If the read request memory 301 is not empty ("NO" at 502), the memory control system 120 begins testing the request done bit REQ_DONE of the oldest entry at 506-510 to determine whether the request is completed ("YES" at 508) or remains pending ("NO" at 508). Once the request is completed ("YES" at 508), the memory control system 120 determines at 512 whether the request was associated with the beginning of a transmit data frame according to the BOF bit in the read request memory entry. If so ("YES" at 512), the memory control system 120 transfers a link word and other transmit control words from the control word memory 302 (indexed according to the frame ID field FID in the read request memory entry) to the first memory 116 at 514. At 516-520, the memory control system 120 transfers the assembled outgoing data from the assembly memory 160 to the first memory 116, beginning at an address given by the contents of the assembly memory read pointer 308 and updates the assembly memory read pointer 308 according to the amount of assembled data transferred to the first memory 116. At 522, once all the assembled outgoing data associated with the request have been transferred, the memory control system 120 updates (e.g., increments) the value of the read request pointer 306, and returns to monitor the next oldest request.

Figure 1I:
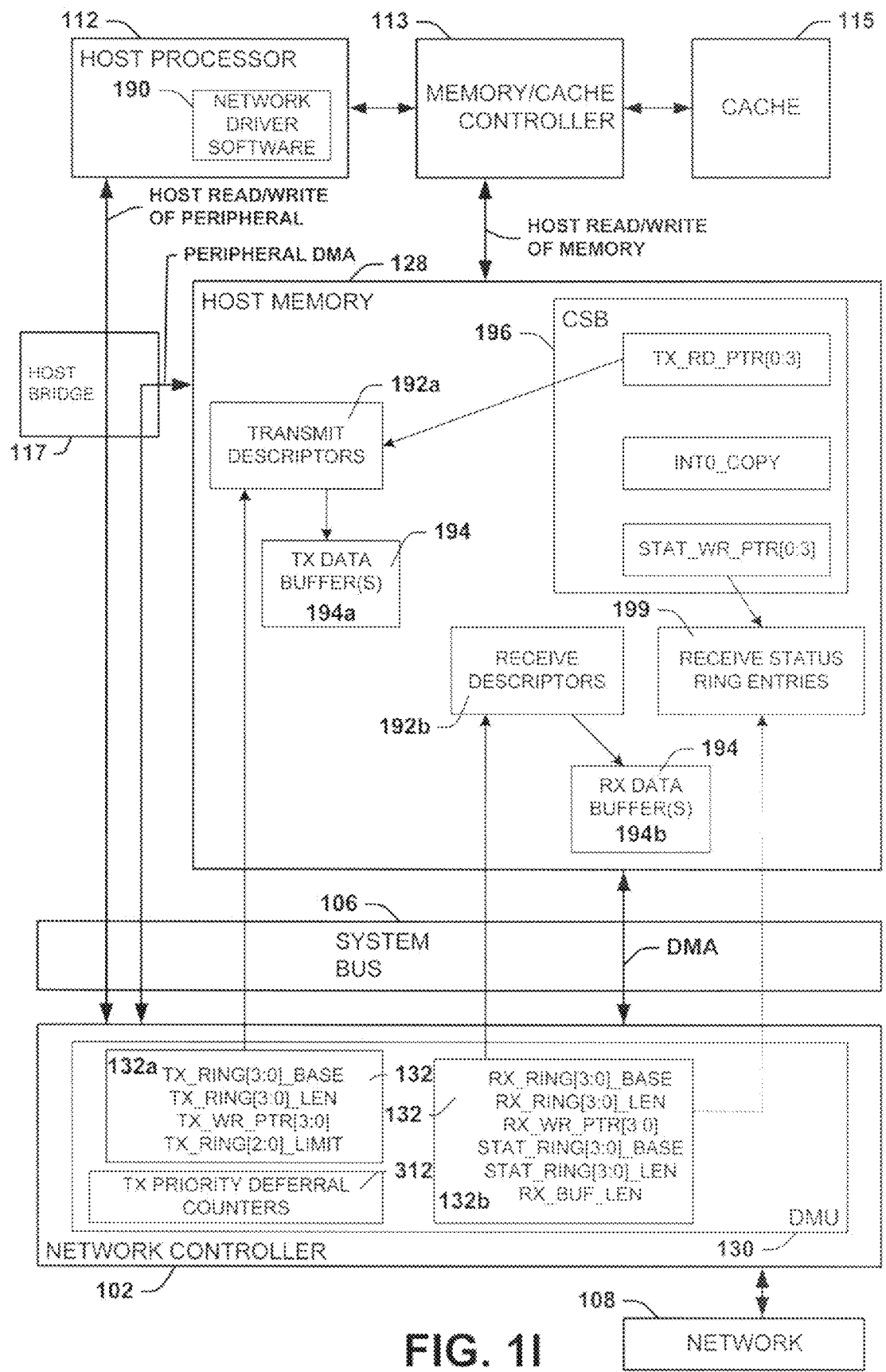
FIG. 1I is a schematic diagram illustrating the exemplary descriptor management system in the network interface system of FIGS. 1A and 1B in accordance with the invention.

FIG. 1I illustrates further aspects of the descriptor system 130 in the network interface 102, which provides outgoing data priority and control information to memory system 107 of FIG. 1A. As illustrated in FIG. 1I, a host processor 112 in the host system 180 comprises peripheral driver software 190, which may communicate with a host memory 128 using a memory/cache controller 113 and the network peripheral 102 via a host bridge 117. The driver 190 provides interface functionality to interface the host processor 112 and software running therein (e.g., upper layers in a network stack) with the network interface peripheral system 102, which in turn, interfaces the driver 190 with the external network 108. While the host processor 112 and the driver 190 may quickly communicate with the shared memory 128 via the memory controller 113 and/or the local bus 117, communication with the peripheral 102 via the system bus 106 is less efficient. Such communication is performed using I/O read and write operations, wherein I/O read operations are particularly costly in terms of processor efficiency since the host processor 112 must wait for a response by the peripheral 102. The host system 180 accordingly includes a descriptor system for transferring incoming data from the peripheral 102 to the host processor 112 and the driver software 190 therein, and for transferring outgoing data and priority information from the host 112 to the peripheral 102 using the shared system memory 128.

The exemplary descriptor system comprises data transfer queues including descriptor and status rings organized as contiguous blocks of memory locations or registers operated as circular memory rings in the shared memory 128, wherein the first location in the block is considered to follow the last register. The memory locations in a descriptor or status ring need not be contiguous and other configurations are possible within the scope of the present invention. An outgoing data (e.g., transmit) descriptor ring in the shared memory stores outgoing data (e.g., transmit) descriptors 192a indicating locations of outgoing data buffers 194a, and an incoming data (e.g., receive) descriptor ring stores incoming data descriptors 192b indicating locations of incoming data buffers 194b in the shared memory 128. An incoming (e.g., receive) data status ring stores incoming data status entries 199 corresponding to incoming data in the incoming data buffers 194b.

The descriptor system also provides a control status block (CSB) 196 in the shared memory 128. The CSB 196 includes memory locations or registers in the shared memory 128, which the host 112 and the driver 190 therein can access using fast memory read operations. The CSB 196 comprises an outgoing data descriptor read pointer TX_RD_PTR[0:3], which indicates a location of an outgoing data descriptor 192a in the outgoing data descriptor ring. The pointer TX_RD_PTR[0:3] and other pointers in the present invention may be a physical address of one of a particular descriptor 192a in the ring, or may be an offset from the address of the first location in the ring, or any other value indicative of the particular descriptor 192a. The outgoing data descriptor read pointer TX_RD_PTR[0:3] indicates a number of outgoing data buffers 194a to which the host processor 112 or the driver 190 therein can write outgoing data. In one implementation illustrated and described below, the pointer TX_RD_PTR[0:3] is written by the peripheral 102 to indicate a descriptor 192a in the ring just beyond the last outgoing descriptor 192a that the peripheral has processed. In this example, the host 112 can proceed to fill outgoing data buffers 194a and corresponding descriptors 192a until the location of the descriptor identified by the pointer TX_RD_PTR[0:3] without having to directly communicate with the peripheral 102.

With respect to incoming data, the CSB 196 further comprises an incoming data status pointer STAT_WR_PTR[0:3], which indicates a location of an incoming data status entry 199 in the incoming data status ring, as well as incoming data interrupt information INTO_COPY. The incoming data status pointer STAT_WR_PTR[0:3] points to a particular status entry 199, such as by direct address or as an offset into the status ring, wherein the particular entry 199 addressed by the pointer STAT_WR_PTR[0:3] indicates a number of incoming data buffers 194b from which the host 112 or the driver 190 can read incoming data. In one example, the pointer STAT_WR_PTR[0:3] is written by the peripheral 102 to indicate a status entry 199 just past the last status entry 199 written by the peripheral. In this example, the host 112 and/or the driver 190 therein can proceed to process incoming data by reading the status ring entries 199 and the incoming data from the corresponding buffers 194b until the location of the descriptor identified by the pointer STAT_WR_PTR[0:3] without having to directly communicate with the peripheral 102. For incoming data, the peripheral 102 writes the incoming data interrupt information INTO_COPY to the CSB 196 and interrupts the host processor 112 to indicate that one or more incoming data status entries 199 and corresponding data in the buffers 194 are ready to be read by the host 112. The host 112, in turn, can read the interrupt information INTO_COPY upon being interrupted, without costly I/O reads to obtain this information from the peripheral 102. In this manner, the status pointer STAT_WR_PTR[0:3] and the interrupt information INTO_COPY allow the host to process incoming data using only fast memory read operations without direct intervention by the peripheral 102.

The descriptor management system 130 may comprise any suitable logic circuitry and memory registers in the peripheral 102. The descriptor management system 130 comprises an outgoing data descriptor write pointer 132a and an incoming data descriptor pointer 132b, implemented as memory registers in the exemplary peripheral 102. The outgoing data descriptor write pointer 132a is written by the host processor 112 and indicates a location of an outgoing data descriptor 192a in the outgoing data descriptor ring and indicates a number of outgoing data buffers 194a from which the peripheral 102 can read outgoing data. The incoming data descriptor pointer 132b is also written by the host 112 and indicates a location of an incoming data descriptor 192b in the incoming data descriptor ring, wherein the incoming data descriptor pointer 132b indicates a number of incoming data buffers 194b to which the peripheral 102 can write incoming data. In the exemplary peripheral 102, the incoming data descriptors 192b in the incoming data descriptor ring may individually indicate the location of a plurality of incoming data buffers 194b in the shared memory 128 to reduce bus bandwidth usage.

With respect to outgoing data, the host processor 112 or the peripheral driver software 190 therein is adapted to read a current outgoing data descriptor read pointer TX_RD_PTR [0:3] from the CSB 196, and to write outgoing data to one or more outgoing data buffers 194a according to the current outgoing data descriptor read pointer TX_RD_PTR[0:3]. The host 112 writes one or more outgoing data descriptors 192a to the outgoing data descriptor ring according to the current outgoing data descriptor read pointer TX_RD_PTR[0:3], and writes an updated outgoing data descriptor write pointer 132a to the descriptor management system 130 in the peripheral 102 according to the number of outgoing data buffers 194a to which outgoing data was written.

The DMU 130 of the peripheral 102 reads one or more outgoing data descriptors 192a from the descriptor ring according to the updated outgoing data descriptor write pointer 132a, and reads outgoing data from one or more outgoing data buffers 194a in accordance therewith. The peripheral 102 then writes an updated outgoing data descriptor read pointer TX_RD_PTR[0:3] to the CSB 196 according to the number of outgoing data buffers 194a from which the peripheral 102 has read outgoing data. The updated outgoing data descriptor write pointer 132a in the descriptor management system 130 comprises an address in the shared memory 128 indicating a location in the outgoing data descriptor ring just beyond the most recent outgoing data descriptor 192a written to the descriptor ring by the host 112. The updated outgoing data descriptor read pointer TX_RD_PTR[0:3] in the CSB 196 comprises an address in the memory 128 indicating a location in the outgoing data descriptor ring just beyond the most recent outgoing data descriptor 192a read by the peripheral 102. In this manner, the outgoing data descriptor read pointer indicates a number of outgoing data buffers 194a to which the host 112 can write outgoing data, and the outgoing data descriptor write pointer 132a indicates a number of outgoing data buffers 194a from which the peripheral 102 can read outgoing data. Consequently, the peripheral 102 and the host 112 can proceed in generally autonomous fashion to transfer outgoing data from the host 112 to the peripheral 102, while mitigating excessive bus bandwidth usage.

For transfer of incoming data from the peripheral 102 to the host 112, the peripheral 102 reads one or more incoming data descriptors 192b from the incoming data descriptor ring according to a current incoming data descriptor pointer 132b. The peripheral 102 then writes incoming data to one or more incoming data buffers 194b according to the descriptors 192a, and writes one or more incoming data status entries 199 in the incoming data status ring according to the one or more incoming data descriptors 192b. The peripheral 102 then writes an updated incoming data status pointer STAT_WR_PTR[0:3] to the CSB 196 according to the number of incoming data buffers 194b that were written by the peripheral 102.

The host 112 reads the updated incoming data status pointer STAT_WR_PTR[0:3] and reads one or more incoming data status entries 199 from the status ring according to the updated pointer STAT_WR_PTR[0:3]. The host 112 reads incoming data from one or more incoming data buffers 194b according to the updated pointer STAT_WR_PTR[0:3] and writes an updated incoming data descriptor pointer 132b to the descriptor management system 130 according to the number of incoming data buffers 194b from which the host 112 has read incoming data. In the exemplary descriptor system, the updated incoming data status pointer STAT_WR_PTR[0:3] in the CSB 196 comprises a memory address indicating a location in the incoming data status ring just beyond the most recent incoming data status entry 199 written by the peripheral 102. The updated incoming data descriptor pointer 132b in the descriptor management system 130 of the peripheral 102 comprises a memory address indicating a location in the incoming data descriptor ring just beyond the most recent incoming data descriptor 192b written by the host 112. In this manner, the incoming data status pointer STAT_WR_PTR[0:3] indicates the number of incoming data buffers 194b from which the host can read incoming data, and the incoming data descriptor pointer indicates a number of incoming data buffers 194b to which the peripheral 102 can write incoming data. In accordance with another aspect of the invention, the exemplary CSB 196 is smaller than a cache line size for the cache memory 115. Furthermore, the exemplary peripheral 102 updates the entire cache line containing the CSB 196 in the shared memory 128 in a single write operation, thereby reducing memory bandwidth usage and mitigating the number of cache line invalidations.

The exemplary descriptor system is configured to accommodate multiple quality of service (QOS) priority levels for incoming and/or outgoing data. In the exemplary system 102 of FIG. 1I, a plurality of outgoing data descriptor rings, incoming data descriptor rings, and incoming data status rings are provided in the shared memory 128. Individual outgoing data descriptor rings correspond to an outgoing data priority level and store outgoing data descriptors 192a indicating locations of outgoing data buffers 194a in the shared memory 128. With respect to incoming data, individual incoming data descriptor rings correspond to incoming data priority levels and store incoming data descriptors indicating locations of incoming data buffers 194b and individual incoming data status rings are likewise associated with a corresponding incoming data priority, where the status rings store incoming data status entries 199 accordingly. The incoming data descriptors 192b, moreover, may each point to a plurality of incoming data buffers 194b, wherein a corresponding plurality of status entries 199 are provided in the status ring.

For QOS support, the CSB 196 comprises a plurality of outgoing data descriptor read pointers TX_RD_PTR[0:3] and a plurality of incoming data status pointers STAT_WR_PTR[0:3]. Individual outgoing data descriptor read pointers TX_RD_PTR[0:3] correspond to an outgoing data priority and indicate a number of outgoing data buffers to which the host can write outgoing data associated with the corresponding outgoing data priority. The individual incoming data status pointers STAT_WR_PTR[0:3] are likewise individually associated with a corresponding incoming data priority and indicate a number of incoming data buffers 194b from which the host 112 can read incoming data for the corresponding incoming data priority. In the peripheral 102, the descriptor management system 130 comprises a plurality of outgoing data descriptor write pointers 132a individually associated with a corresponding outgoing data priority, which indicate a number of outgoing data buffers 194a from which the peripheral 102 can read outgoing data for the corresponding outgoing data priority. In addition, the system 130 comprises a plurality of incoming data descriptor pointers 132b, each associated with a corresponding incoming data priority. The pointers 132 individually indicate a number of incoming data buffers 194b to which the peripheral 102 can write incoming data for that priority. As shown in FIG. 1G, the host processor 112 may locally access the shared memory 128 and a cache memory 115 via a memory/cache controller 113 and may communicate directly with the network controller 102 via I/O read and write operations across a system bus 106 using a host bridge 117, for example, where the exemplary system bus 106 is a PCI-X bus. The host memory 112 includes the control status block (CSB) 196, transmit/receive data buffers 194, as well as descriptor locations for transmit descriptors 192a, receive descriptors 192b, and receive status entries 199.

Figure 2:
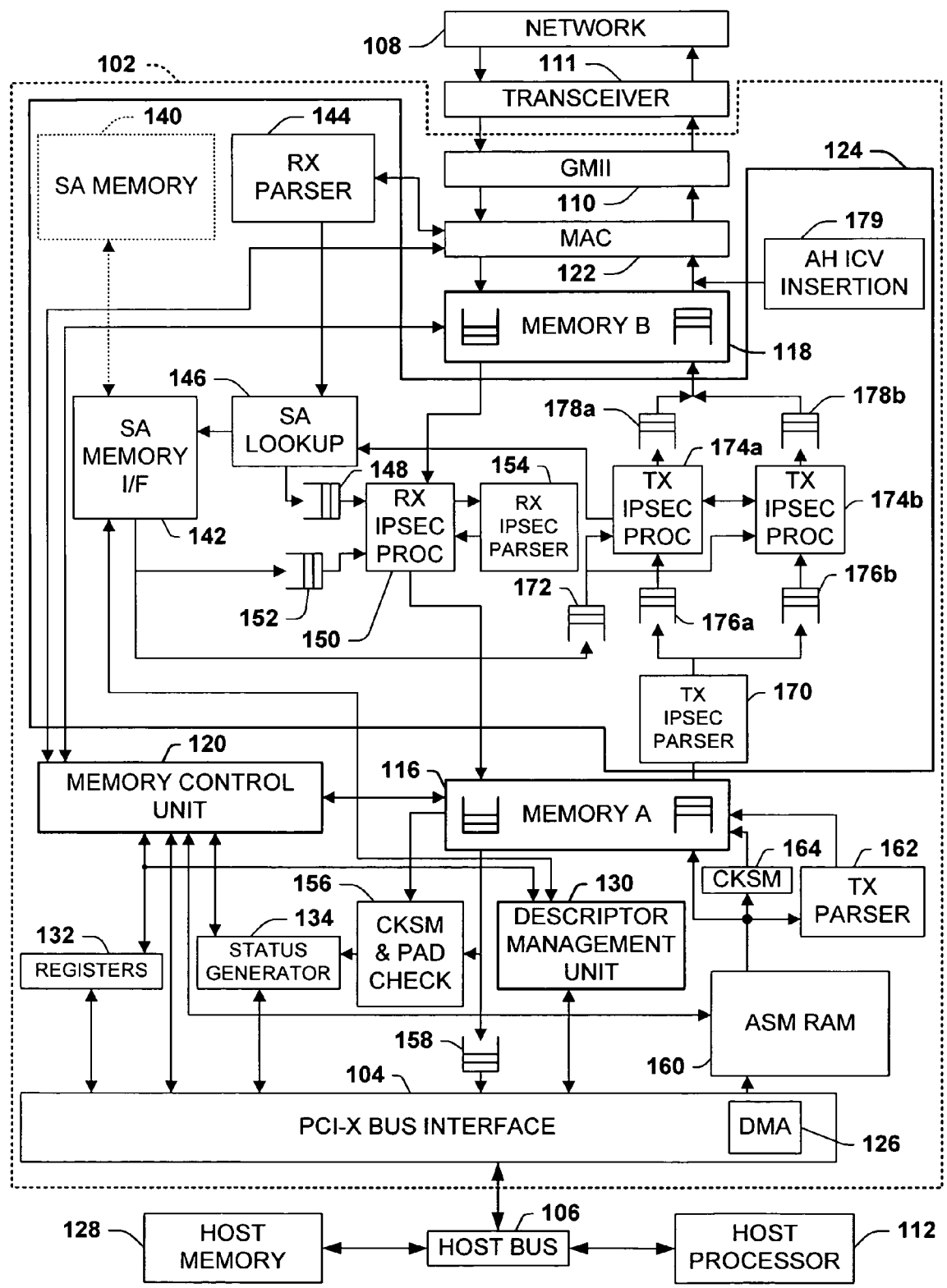
FIG. 2 is a schematic diagram illustrating further details of the exemplary network interface system in which various aspects of the invention may be carried out.
Figure 3:
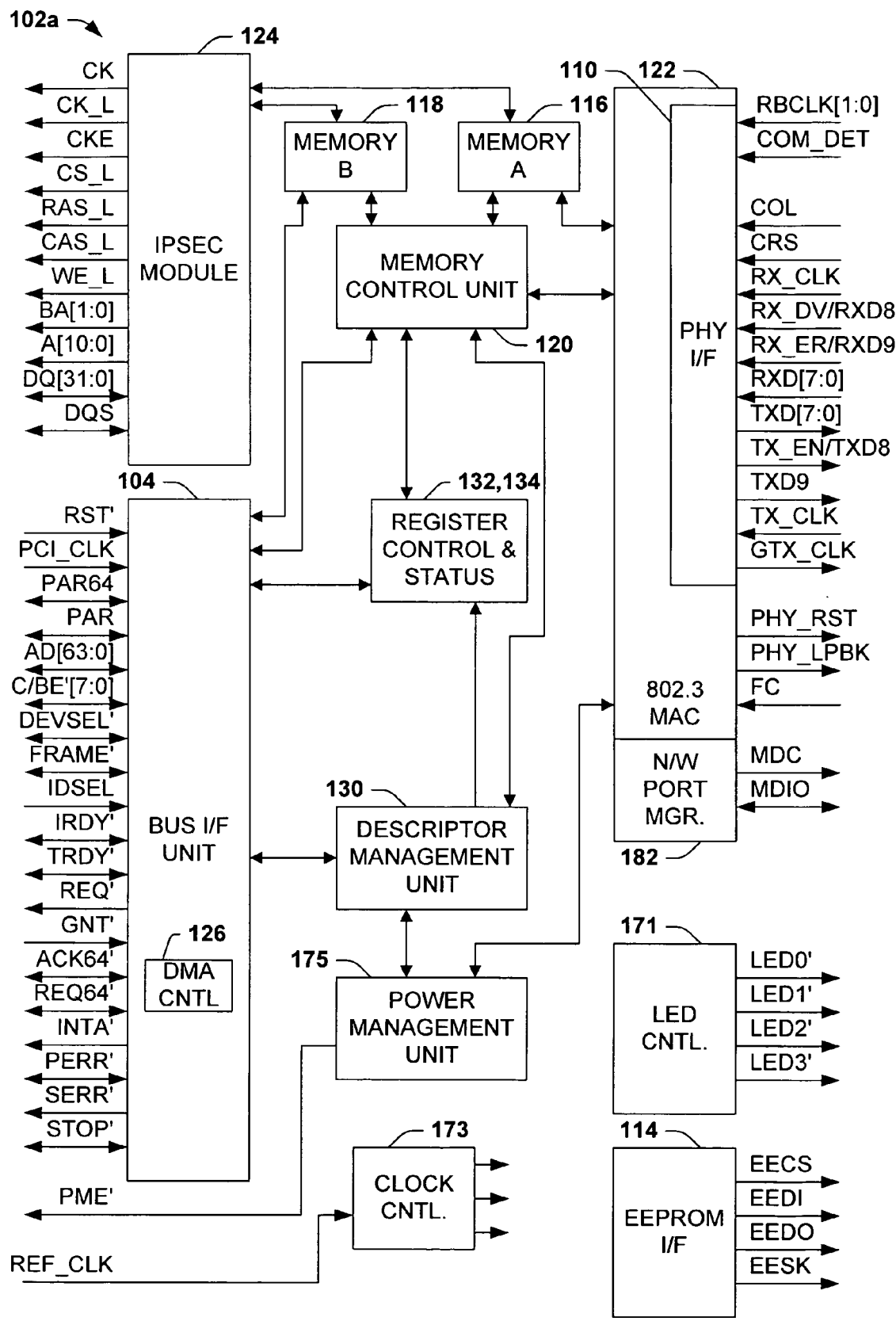
FIG. 3 is a schematic diagram illustrating an exemplary single-chip network controller implementation of the network interface system of FIG. 2.
Figure 4:
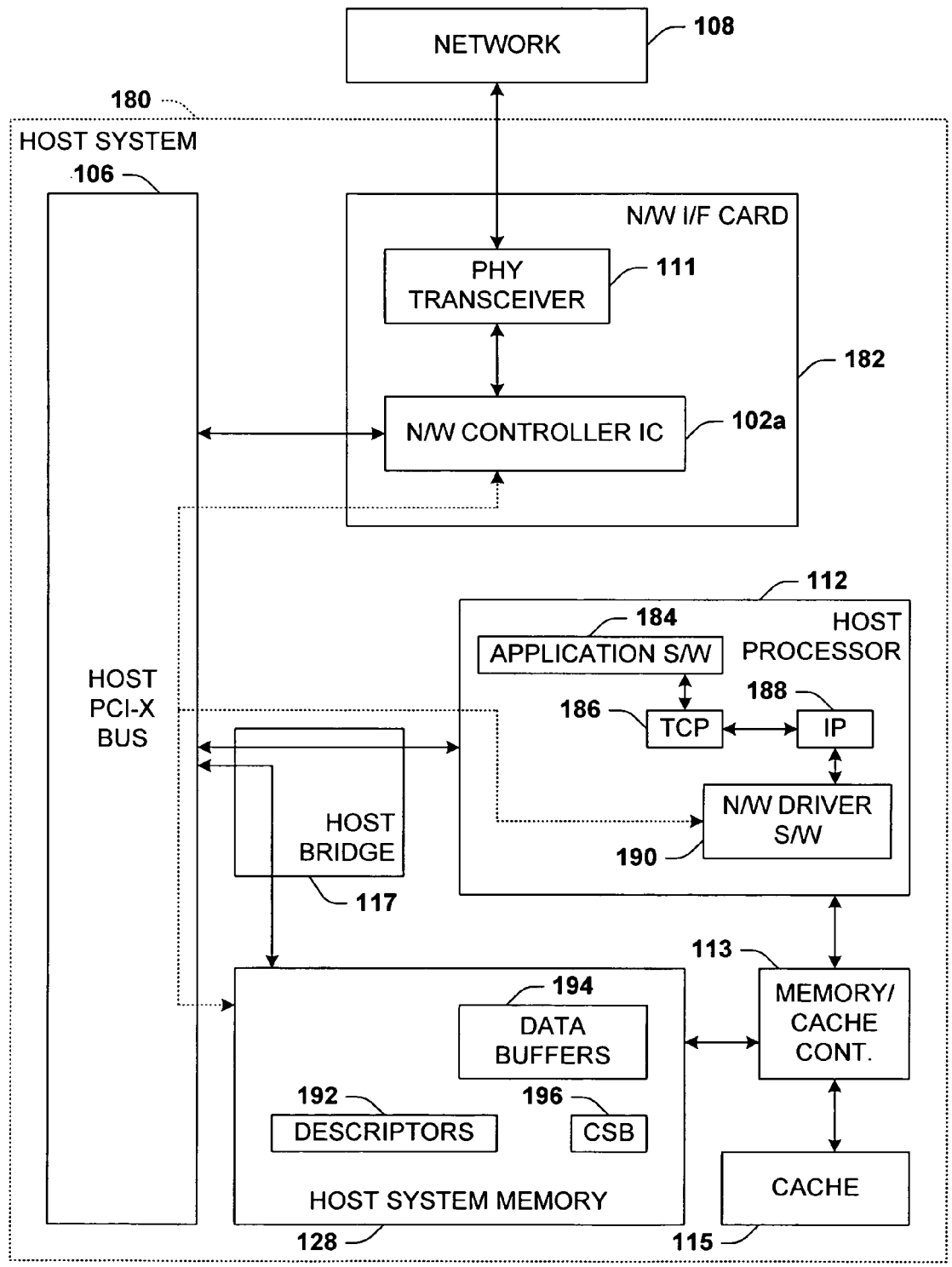
FIG. 4 is a schematic diagram illustrating a host system interfacing with a network using the exemplary network interface system of FIG. 3.

A more detailed structural/functional and operational overview of the exemplary network controller 102 in accordance with the present invention will be provided below in conjunction with FIGS. 2-4, in order to facilitate a thorough understanding of the present invention. FIG. 2 illustrates a network interface peripheral or network controller 102 in accordance with one or more aspects of the present invention, and FIGS. 3 and 4 illustrate an exemplary single-chip implementation 102a of the network controller 102. The exemplary single-chip network controller 102a includes all the functionality and components described herein with respect to the network interface system 102, and the systems 102, 102a include all the components, systems, and functionality of the system described above. The various blocks, systems, modules, engines, etc. described herein may be implemented using any appropriate analog and/or digital circuitry, wherein one or more of the blocks, etc. described herein may be combined with other circuitry in accordance with the invention.

The network controller 102 includes a 64-bit PCI-X bus interface 104 for connection with a host PCI or PCI-X bus 106 that operates at a clock speed up to 133 MHz in PCI-X mode or up to 66 MHz in standard PCI mode. The network controller 102 may be operated as a bus master or a slave. Much of the initialization can be done automatically by the network controller 102 when it reads an optional EEPROM (not shown), for example, via an EEPROM interface 114 (FIG. 3). The network controller 102 can be connected to an IEEE 802.3 or proprietary network 108 through an IEEE 802.3-compliant Media Independent Interface (MII) or Gigabit Media Independent Interface (GMII) 110, for interfacing the controller 102 with the network 108 via an external transceiver device 111. For 1000 Mb/s operation the controller 102 supports either the byte-wide IEEE 802.3 Gigabit Media Independent Interface (GMII) for 1000BASE-T PHY devices 111 or the IEEE 802.3 Ten-Bit Interface (TBI) for 1000BASE-X devices 111. The network controller 102 supports both half-duplex and full-duplex operation at 10 and 100 Mb/s rates and full-duplex operation at 1000 Mb/s.

A host device, such as a host processor 112 on the host PCI-X bus 106 in a host system 180, may interface with the network controller 102 via the bus 106 and a host bridge 117. The host processor 112 includes one or more processors that can operate in a coordinated fashion. Referring also to FIG. 4, the network single-chip network controller 102a may be provided on a network interface card or circuit board 182, together with a PHY transceiver 111 for interfacing the host processor 112 with the network 108 via the host bridge 117, the host bus 106, and the transceiver 111. The PCI-X bus interface 104 includes PCI configuration registers used to identify the network controller 102a to other devices on the PCI bus and to configure the device. Once initialization is complete, the host processor 112 has direct access to the I/O registers of the network controller 102 for performance tuning, selecting options, collecting statistics, and starting transmissions through the host bridge 117 and the bus 106. The host processor 112 is operatively coupled with the host system memory 128 and a cache memory 115 via a memory/cache controller 113. One or more application software programs 184 executing in the host processor 112 may be provided with network service via layer 4 (e.g., transport layer) software, such as transmission control protocol (TCP) layer software 186, layer 3 (e.g., network layer) software 188, such as internet protocol (IP) software 188, and a software network driver 190, also running on the host processor 112. As discussed below, the network driver software 190 interacts with the host memory 128 and the network controller 102 to facilitate data transfer between the application software 184 and the network 108.

As illustrated in FIG. 2, the exemplary network controller 102 comprises first and second internal random access memories MEMORY A 116 and MEMORY B 118, organized as first-in first-out (FIFO) memories for storage of frames. A memory control unit 120 is provided for control and operation of the memories 116 and 118. The network controller 102 also comprises a media access control (MAC) engine 122 satisfying requirements for operation as an Ethernet/IEEE 802.3-compliant node and providing the interface between the memory 118 and the GMII 110. The MAC engine 122 may be operated in full or half-duplex modes. An Internet Protocol Security (IPsec) engine 124 coupled with the memories 116 and 118 provides authentication and/or encryption functions.

The PCI-X bus interface 104 includes a Direct Memory Access (DMA) controller 126 that automatically transfers network frame data between the network controller 102 and buffers in host system memory 128 via the host bus 106. The operation of the DMA controller 126 is directed by a descriptor management unit 130 according to data structures called descriptors 192, which include pointers to one or more data buffers 194 in system memory 128, as well as control information. The descriptors 192 are stored in the host system memory 128 in queues called descriptor rings. Four transmit descriptor rings are provided for transmitting frames and four receive descriptor rings for receiving frames, corresponding to four priorities of network traffic in the illustrated controller 102. Additionally, four receive status rings are provided, one for each priority level, that facilitate synchronization between the network controller 102 and the host system. Transmit descriptors 192 control the transfer of frame data from the system memory 128 to the controller 102, and receive descriptors 192 control the transfer of frame data in the other direction. In the exemplary controller 102, each transmit descriptor 192 corresponds to one network frame, whereas each receive descriptor 192 corresponds to one or more host memory buffers in which frames received from the network 108 can be stored.

The software interface allocates contiguous memory blocks for descriptors 192, receiver status, and data buffers 194. These memory blocks are shared between the software (e.g., the network driver 190) and the network controller 102 during normal network operations. The descriptor space includes pointers to network frame data in the buffers 194, the receiver status space includes information passed from the controller 102 to the software in the host 112, and the data buffer areas 194 for storing frame data that is to be transmitted (e.g., outgoing data) and for frame data that has been received (e.g., incoming data).

Synchronization between the controller 102 and the host processor 112 is maintained by pointers stored in hardware registers 132 in the controller 102, pointers stored in a controller status block (CSB) 196 in the host system memory 128, and interrupts. The CSB 196 is a block of host system memory 128 that includes pointers into the descriptor and status rings and a copy of the contents of the controller's interrupt register. The CSB 196 is written by the network controller 102 and read by the host processor 112. Each time the software driver 190 in the host 112 writes a descriptor or set of descriptors 192 into a descriptor ring, it also writes to a descriptor write pointer register in the controller 102. Writing to this register causes the controller 102 to start the transmission process if a transmission is not already in progress. Once the controller has finished processing a transmit descriptor 192, it writes this information to the CSB 196. After receiving network frames and storing them in receive buffers 194 of the host system memory 128, the controller 102 writes to the receive status ring and to a write pointer, which the driver software 190 uses to determine which receive buffers 194 have been filled. Errors in received frames are reported to the host memory 128 via a status generator 134.

The IPsec module or engine 124 provides standard authentication, encryption, and decryption functions for transmitted and received frames. For authentication, the IPsec module 124 implements the HMAC-MD5-96 algorithm defined in RFC 2403 (a specification set by the Internet Engineering Task Force) and the HMAC-SHA-1-96 algorithm defined in RFC 2404. For encryption, the module implements the ESP DES-CBC (RFC 2406), the 3DES-CBC, and the AES-CBC encryption algorithms. For transmitted frames, the controller 102 applies IPsec authentication and/or encryption as specified by Security Associations (SAs) stored in a private local SA memory 140, which are accessed by IPsec system 124 via an SA memory interface 142. SAs are negotiated and set by the host processor 112. SAs include IPsec keys, which are required by the various authentication, encryption, and decryption algorithms, IPsec key exchange processes are performed by the host processor 112. The host 112 negotiates SAs with remote stations and writes SA data to the SA memory 140. The host 112 also maintains an IPsec Security Policy Database (SPD) in the host system memory 128.

A receive (RX) parser 144 associated with the MAC engine 122 examines the headers of received frames to determine what processing needs to be done. If it finds an IPsec header, it uses information contained in the header, including a Security Parameters Index (SPI), an IPsec protocol type, and an LP destination address to search the SA memory 140 using SA lookup logic 146 and retrieves the applicable security association. The result is written to an SA pointer FIFO memory 148, which is coupled to the lookup logic 146 through the SA memory interface 142. The key corresponding to the SA is fetched and stored in RX key FIFO 152. A receive (RX) IPsec processor 150 performs the processing requires by the applicable SA using the key. The controller 102 reports what security processing it has done, so that the host 112 can check the SPD to verify that the frame conforms with policy. The processed frame is stored in the memory 116.

A receive IPsec parser 154, associated with IPsec processor 150, performs parsing that cannot be carried out before packet decryption. Some of this information is used by a receive (Rx) checksum and pad check system 156, which computes checksums specified by headers that may have been encrypted and also checks pad bits that may have been encrypted to verify that they follow a pre-specified sequence for pad bits. These operations are carried out while the received frame is passed to the PCI-X bus 104 via FIFO 158. The checksum and pad check results are reported to the status generator 134.

In the transmit path, an assembly RAM 160 is provided to accept frame data from the system memory 128, and to pass the data to the memory 116. The contents of a transmit frame can be spread among multiple data buffers 194 in the host memory 128, wherein retrieving a frame may involve multiple requests to the system memory 128 by the descriptor management unit 130. These requests are not always satisfied in the same order in which they are issued. The assembly RAM 160 ensures that received chunks of data are provided to appropriate locations in the memory 116. For transmitted frames, the host 112 checks the SPD (IPsec Security Policy Database) to determine what security processing is needed, and passes this information to the controller 102 in the frame's descriptor 192 in the form of a pointer to the appropriate SA in the SA memory 140. The frame data in the host system memory 128 provides space in the IPsec headers and trailers for authentication data, which the controller 102 generates. Likewise, space for padding (to make the payload an integral number of blocks) is provided when the frame is stored in the host system memory buffers 194, but the pad bits are written by the controller 102.

As the data is sent out from the assembly RAM 160, it passes also into a first transmit (TX) parser 162, which reads the MAC header, the IP header (if present), the TCP or UDP header, and determines what kind of a frame it is, and looks at control bits in the associated descriptor. In addition, the data from the assembly RAM 160 is provided to a transmit checksum system 164 for computing IP header and/or TCP checksums, which values will then be inserted at the appropriate locations in the memory 116. The descriptor management unit 130 sends a request to the SA memory interface 142 to fetch an SA key, which is then provided to a key FIFO 172 that feeds a pair of TX IPsec processors 174a and 174b. Frames are selectively provided to one of a pair of TX IPsec processors 174a and 174b for encryption and authentication via TX IPsec FIFOs 176a and 176b, respectively, wherein a transmit IPsec parser 170 selectively provides frame data from the memory 116 to a selected one of the processors 174. The two transmit IPsec processors 174 are provided in parallel because authentication processing cannot begin until after encryption processing is underway. By using the two processors 174, the speed is comparable to the receive side where these two processes can be carried out simultaneously.

Authentication does not cover mutable fields, such as occur in IP headers. The transmit IPsec parser 170 accordingly looks for mutable fields in the frame data, and identifies these fields to the processors 174a and 174b. The output of the processors 174a and 174b is provided to the second memory 118 via FIFOs 178a and 178b, respectively. An Integrity Check Value (ICV), which results from authentication processing, is inserted into the appropriate IPsec header by an insertion unit 179 as the frame data is passed from the memory 118 to the MAC engine 122 for transmission to the network 108.

In the single-chip implementation of FIG. 3, the controller 102a comprises a network port manager 182, which may automatically negotiate with an external physical (PHY) transceiver via management data clock (MDC) and management data I/O (MDIO) signals. The network port manager 175 may also set up the MAC engine 122 to be consistent with the negotiated configuration. Circuit board interfacing for LED indicators is provided by an LED controller 171, which generates LED driver signals LED0'-LED3' for indicating various network status information, such as active link connections, receive or transmit activity on the network, network bit rate, and network collisions. Clock control logic 173 receives a free-running 125 MHz input clock signal as a timing reference and provides various clock signals for the internal logic of the controller 102a.

A power management unit 175, coupled with the descriptor management unit 130 and the MAC engine 122, can be used to conserve power when the device is inactive. When an event requiring a change in power level is detected, such as a change in a link through the MAC engine 122, the power management unit 175 provides a signal PME' indicating that a power management event has occurred. The external serial EEPROM interface 114 implements a standard EEPROM interface, for example, the 93Cxx EEPROM interface protocol. The leads of external serial EEPROM interface 114 include an EEPROM chip select (EECS) pin, EEPROM data in and data out (EEDI and EEDO, respectively) pins, and an EEPROM serial clock (EESK) pin.

In the bus interface unit 104, address and data are multiplexed on bus interface pins AD[63:0]. A reset input RST' may be asserted to cause the network controller 102a to perform an internal system reset. A cycle frame I/O signal FRAME' is driven by the network controller when it is the bus master to indicate the beginning and duration of a transaction, and a PCI clock input PCI_CLK is used to drive the system bus interface over a frequency range of 15 to 133 MHz on the PCI bus (e.g., host bus 106). The network controller 102a also supports Dual Address Cycles (DAC) for systems with 64-bit addressing, wherein low order address bits appear on the AD[31:0] bus during a first clock cycle, and high order bits appear on AD[63:32] during the second clock cycle. A REQ64' signal is asserted by a device acting as bus master when it wants to initiate a 64-bit data transfer, and the target of the transfer asserts a 64-bit transfer acknowledge signal ACK64' to indicate that it is willing to transfer data using 64 bits. A parity signal PAR64 is an even 8 byte parity signal that protects AD[63:32] The bus master drives PAR64 for address and write data phases and the target drives PAR64 for read data phases.

The network controller 102a asserts a bus request signal REQ' to indicate that it wishes to become a bus master, and a bus grant input signal GNT' indicates that the access to the bus has been granted to the network controller. An initialization device select input signal IDSEL is used as a chip select for the network controller during configuration read and write transactions. Bus command and byte enable signals C/BE[7: 0] are used to transfer bus commands and to indicate which physical bytes of data lines AD[63:0] carry meaningful data. A parity I/O signal PAR indicates and verifies even parity across AD[31:0] and C/BE[3:0].

The network controller 102a drives a drive select I/O signal DEVSEL' when it detects a transaction that selects the network controller 102a as a target. The network controller 102a checks DEVSEL' to see if a target has claimed a transaction that the network controller initiated. TRDY' is used to indicate the ability of the target of the transaction to complete the current data phase, and IRDY' indicates the ability of the initiator of the transaction to complete the current data phase. Interrupt request output signal INTA' indicates that one or more enabled interrupt flag bits are set. The network controller 102a asserts a parity error I/O signal PERR' when it detects a data parity error, and asserts a system error output signal SERR' when it detects an address parity error. In addition, the controller 102a asserts a stop I/O signal STOP' to inform the bus master to stop the current transaction.

In the MAC engine 122, a physical interface reset signal PHY_RST is used to reset the external PHY 111 (MII, GMII, TBI), a PHY loop-back output PHY_LPBK is used to force an external PHY device 111 into loop-back mode for systems testing, and a flow control input signal FC controls when the MAC transmits a flow control frame. The network controller 102a provides an external PHY interface 110 that is compatible with either the Media Independent Interface (MII), Gigabit Media Independent Interface (GMII), or Ten Bit Interface (TBI) per IEEE Std 802.3. Receive data input signals RXD [7:0] and output signals TXD[7:0] are used for receive and transmit data exchange, respectively. When the network controller 102a is operating in GMII or MII mode, TX_EN/TXD [8] is used as a transmit enable. In TBI mode, this signal is bit 8 of the transmit data bus. RX_DV/RXD[8] is an input used to indicate that valid receive data is being presented on the RX pins. In TBI mode, this signal is bit 8 of the receive data bus.

When the network controller 102a is operating in GMII or MIT mode, RX_ER/RXD[9] is an input that indicates that the external transceiver device has detected a coding error in the receive frame currently being transferred on the RXD pins. In TBI mode, this signal is bit 9 of the receive data bus. MII transmit clock input TX_CLK is a continuous clock input that provides the timing reference for the transfer of the TX_EN and TXD[3:0] signals out of the network controller 102a in MII mode. GTX_CLK is a continuous 125 MHz clock output that provides the timing reference for the TX_EN and TXD signals from the network controller when the device is operating in GMII or TBI mode. RX_CLK is a clock input that provides the timing reference for the transfer of signals into the network controller when the device is operating in MII or GMII mode. COL is an input that indicates that a collision has been detected on the network medium, and a carrier sense input signal CRS indicates that a non-idle medium, due either to transmit or receive activity, has been detected (CRS is ignored when the device is operating in full-duplex mode). In TBI mode, 10-bit code groups represent 8-bit data packets. Some 10-bit code groups are used to represent commands. The occurrence of even and odd code groups and special sequences called commas are all used to acquire and maintain synchronization with the PHY 110. RBCLK[0] is a 62.5 MHz clock input that is used to latch odd-numbered code groups from the PHY device, and RBCLK[1] is used to latch even-numbered code groups. RBCLK[1] is always 180 degrees out of phase with respect to RBCLK[0]. COM_DET is asserted by an external PHY 111 to indicate the code group on the RXD[9:0] inputs includes a valid comma.

The IPsec module 124 includes an external RAM interface to memories 116 and 118. When CKE is driven high, an internal RAM clock is used to provide synchronization, otherwise the differential clock inputs CK and CK_L are used. The RAM's have a command decoder, which is enabled when a chip select output CS_L is driven low. The pattern on the WE_L, RAS_L, and CAS_L pins defines the command that is being issued to the RAM. Bank address output signals BA[1:0] are used to select the memory to which a command is applied, and an address supplied by RAM address output pins A[10:0] selects the RAM word that is to be accessed. A RAM data strobe I/O signal DQS provides the timing that indicates when data can be read or written, and data on RAM data I/O pins DQ[31:0] are written to or read from either memory 116 or 118.

Referring again to FIG. 2, an operational discussion of receive and transmit operation of the network controller 102 is provided below. Starting with receipt of a data frame from the network media 108 (e.g., an optical fiber), the frame is delivered to the GMII 110 (the Gigabit Media-Independent Interface), for example, as a series of bytes or words in parallel. The GMII 110 passes the frame to the MAC 122 according to an interface protocol, and the MAC 122 provides some frame management functions. For example, the MAC 122 identifies gaps between frames, handles half duplex problems, collisions and retries, and performs other standard Ethernet functions such as address matching and some checksum calculations. The MAC 122 also filters out frames, checks their destination address and accepts or rejects the frame depending on a set of established rules.

The MAC 122 can accept and parse several header formats, including for example, IPv4 and IPv6 headers. The MAC 122 extracts certain information from the frame headers. Based on the extracted information, the MAC 122 determines which of several priority queues (not shown) to put the frame in. The MAC places some information, such as the frame length and priority information, in control words at the front of the frame and other information, such as whether checksums passed, in status words at the back of the frame. The frame passes through the MAC 122 and is stored in the memory 118 (e.g., a 32 KB RAM). In this example, the entire frame is stored in memory 118. The frame is subsequently downloaded to the system memory 128 to a location determined by the descriptor management unit 130 according to the descriptors 192 in the host memory 128 (FIG. 4), wherein each receive descriptor 192 comprises a pointer to a data buffer 194 in the system memory 128. Transmit descriptors include a pointer or a list of pointers, as will be discussed in greater detail supra. The descriptor management unit 130 uses the DMA 126 to read the receive descriptor 192 and retrieve the pointer to the buffer 194. After the frame has been written to the system memory 128, the status generator 134 creates a status word and writes the status word to another area in the system memory 128, which in the present example, is a status ring. The status generator 134 then interrupts the processor 112. The system software (e.g., the network driver 190 in FIG. 4) can then check the status information, which is already in the system memory 128. The status information includes, for example, the length of the frame, what processing was done, and whether or not the various checksums passed.

In transmit operation, the host processor 112 initially dictates a frame transmission along the network 108, and the TCP layer 186 of the operating system (OS) in the host processor 112 is initiated and establishes a connection to the destination. The TCP layer 186 then creates a TCP frame that may be quite large, including the data packet and a TCP header. The IP layer 188 creates an IP header, and an Ethernet (MAC) header is also created, wherein the data packet, and the TCP, IP, and MAC headers may be stored in various locations in the host memory 128. The network driver 190 in the host processor 112 may then assemble the data packet and the headers into a transmit frame, and the frame is stored in one or more data buffers 194 in the host memory 128. For example, a typical transmit frame might reside in four buffers 194: the first one containing the Ethernet or MAC header, the second one having the IP header, the third one the TCP header, and the fourth buffer containing the data. The network driver 190 generates a transmit descriptor 192 that includes a list of pointers to all these data buffers 194.

The frame data is read from the buffers 194 into the controller 102. To perform this read, the descriptor management unit 130 reads the transmit descriptor 192 and issues a series of read requests on the host bus 106 using the DMA controller 126 using the memory control system 120 and the bus interface system 104 as described above. However, the requested data portions may not arrive in order they were requested, wherein the PCI-X interface 104 indicates to the DMU 130 the request with which the data is associated. Using such information, the memory control system 120 organizes and properly orders the data to reconstruct the frame in the assembly memory 160, and may also perform some packing operations to fit the various pieces of data together and remove gaps. After assembly in the assembly memory 160, the frame is passed to the first memory 116 (e.g., a 32 KB RAM in the illustrated example). As the data passes from the assembly RAM 160, the data also passes to the TX parser 162. The TX parser 162 reads the headers, for example, the MAC headers, the IP headers (if there is one), the TCP or UDP header, and determines what kind of a frame it is, and also looks at the control bits that were in the associated transmit descriptor 192. The data frame is also passed to the transmit checksum system 164 for computation of TCP and/or IP layer checksums.

The transmit descriptor 192 may comprise control information, including bits that instruct the transmit checksum system 164 whether to compute an IP header checksum and/or TCP checksum. If those control bits are set, and the parser 162 identifies or recognizes the headers, then the parser 162 tells the transmit checksum system 164 to perform the checksum calculations, and the results are put at the appropriate location in the frame in the memory 116. After the entire frame is loaded in the memory 116, the MAC 122 can begin transmitting the frame, or outgoing security processing (e.g., encryption and/or authentication) can be performed in the IPsec system 124 before transmission to the network 108.

By offloading the transmit checksumming function onto the network controller 102 of the present invention, the host processor 112 is advantageously freed from that task. In order for the host processor 112 to perform the checksum, significant resources must be expended. Although the computation of the checksum is relatively simple, the checksum, which covers the entire frame, must be inserted at the beginning of the frame. In conventional architectures, the host computer makes one pass through the frame to calculate the checksum, and then inserts the checksum at the beginning of the frame. The data is then read another time as it is loaded into the controller. The network controller 102 further reduces the load on the host processor 112 by assembling the frame using direct access to the system memory 128 via the descriptors 192 and the DMA controller 126. Thus, the network controller 102 frees the host processor 112 from several time consuming memory access operations.

In addition to the receive and transmit functions identified above, the network controller 102 may also be programmed to perform various segmentation functions during a transmit operation. For example, the TCP protocol allows a TCP frame to be as large as 64,000 bytes. The Ethernet protocol does not allow data transfers that large, but instead limits a network frame to about 1500 bytes plus some headers. Even in the instance of a jumbo frame option that allows 16,000 byte network frames, the protocol does not support a 64 KB frame size. In general, a transmit frame initially resides in one or more of the data buffers 194 in system memory 128, having a MAC header, an IP header, and a TCP header, along with up to 64 KB of data. Using the descriptor management unit 130, the frame headers are read, and an appropriate amount of data (as permitted by the Ethernet or network protocol) is taken and transmitted. The descriptor management unit 130 tracks the current location in the larger TCP frame and sends the data block by block, each block having its own set of headers.

For example, when a data transmit is to occur, the host processor 112 writes a descriptor 192 and informs the controller 102. The descriptor management unit 130 receives a full list of pointers, which identify the data buffers 194, and determines whether TCP segmentation is warranted. The descriptor management unit 130 then reads the header buffers and determines how much data can be read. The headers and an appropriate amount of data are read into the assembly RAM 160 and the frame is assembled and transmitted. The controller 102 then re-reads the headers and the next block or portion of the untransmitted data, modifies the headers appropriately and forms the next frame in the sequence. This process is then repeated until the entire frame has been sent, with each transmitted portion undergoing any selected security processing in the IPsec system 124.

The network controller 102 also advantageously incorporates IPSec processing therein. In contrast with conventional systems that offload IPSec processing, the present invention employs on-board IPSec processing, which may be implemented as a single-chip device 102a (FIG. 3). In conventional systems, either the host processor carries out IPSec processing or a co-processor, separate from the network controller, is employed. Use of the host processor is very slow, and in either case, the frame passes at least three times through the memory bus. For example, when a co-processor is used, the frame passes through the bus once as it is read from memory and sent to the co-processor, again as it passes back to the system memory, and a third time as it is sent to the network controller. This processing consumes significant bandwidth on the PCI bus and negatively impacts system performance. A similar performance loss is realized in the receive direction.

IPSec processing has two primary goals: first is to encrypt, or scramble, the data so that an unauthorized person or system cannot read the data. The second goal is authentication, which ensures that the packet is uncorrupted and that the packet is from the expected person or system. A brief discussion of the on-board IPSec processing follows below. The network controller 102 of the present invention takes advantage of security associations (SAs) using the SA memory interface 142, the SA lookup 146, and the SA memory 140. As briefly highlighted above, a security association is a collection of bits that describe a particular security protocol, for example, whether the IPSec portion 124 is to perform an encryption or authentication, or both, and further describes what algorithms to employ. There are several standard encryption and authentication algorithms, so the SA interface 142 and SA lookup 146 indicates which one is to be used for a particular frame. The SA memory 140 in the present example is a private memory, which stores the encryption keys. The SAs are obtained according to an IPSec protocol whereby sufficient information is exchanged with a user or system on the network to decide which algorithms to use and allow both parties to generate the same keys. After the information exchange is completed, the software calls the driver 190, which writes the results into the SA memory 140.

Once the key exchange is complete, the appropriate bits reside in the SA memory 140 that indicate which key is to be used and which authentication algorithm, as well as the actual keys. In transmit mode, part of the descriptor 192 associated with a given outgoing frame includes a pointer into the SA memory 140. When the descriptor management unit 130 reads the descriptor 192, it sends a request to the SA memory interface 142 to fetch the key, which then sends the key to the key FIFO 172, that feeds the TX IPSec processing modules 174a and 174b, respectively. When both encryption and authentication are to be employed in transmit, the process is slightly different because the tasks are not performed in parallel. The authentication is a hash of the encrypted data, and consequently, the authentication waits until at least a portion of the encryption has been performed. Because encryption may be iterative over a series of data blocks, there may be a delay between the beginning of the encryption process and the availability of the first encrypted data. To avoid having this delay affect device performance, the exemplary network interface 102 employs two TX IPSec process engines 174a and 174b, wherein one handles the odd numbered frames and the other handles the even numbered frames in the illustrated example.

Prior to performing the IPSec processing, the TX IPsec parser 170 parses the frame headers and looks for mutable fields therein, which are fields within the headers that are not authenticated because they vary as the frame travels over the network 108. For example, the destination address in the IP header varies as the frame goes across the Internet from router to router. The transmit IPsec parser 170 identifies the mutable fields and passes the information to the TX IPSec processors 174, which selectively skip over the mutable field portions of the frames. The processed frames are sent to FIFOs 178a and 178b and subsequently accumulated in the memory 118. The result of the authentication processing is an integrity check value (ICV), which is inserted by insertion block 179 into the appropriate IPsec header as the frame is transmitted from the memory 118 to the network media 108.

In receive mode, a received frame comes into the MAC 122 and the RX parser 144. The RX parser 144 parses the incoming frame up to the IPsec headers and extracts information therefrom. The fields that are important to the RX parser 144 are, for example, the destination IP address in the IP header, the SPI (Security Protocol Index), and a protocol bit that indicates whether an IPSec header is an authentication header (AH) or an encapsulation security protocol (ESP) header. Some of the extracted information passes to the SA lookup block 146. The SA lookup block 146 identifies the appropriate SA and conveys the information to the SA memory interface 142 that retrieves the SA and places it into the key FIFO 152:

The SA lookup block 146 employs an on-chip SPI Table and the off-chip SA memory 140. The SPI Table is organized into 4096 bins, each comprising 4 entries. The entries include the 32-bit SPI, a hash of the destination address (DA), a bit to indicate the protocol, and a bit to indicate whether the entry is used. Corresponding entries in the SA memory contain the full DAs and the SA (two SAs when there is both authentication and encryption). The bin for each entry is determined by a hash of the SPI. To look up an SA, a hash of the SPI from the received frame is used to determine which bin to search. Within the bin, the SA lookup block 146 searches the entries for a match to the full SPI, the destination address hash, and the protocol bit. After searching, the SA lookup block writes an entry to the SA pointer FIFO 148, which either identifies a matching entry or indicates no match was found. A check of the DA address from the SA memory is made just before security processing. If there is no match, security processing is not performed on the frame in question. Based on the entries in the SA pointer FIFO 148, the keys are fetched from the external SA memory 140 and placed in the key FIFO 152. The RX IPSec processor 150 takes the keys that come in from the FIFO 152, reads the corresponding frame data out of the memory 118, and begins processing the frame, as required. For receive processing, decryption and authentication proceed in parallel (on receive, decryption and authentication are not sequential processes), and thus in this example only one RX IPSec processor is used.

The RX IPSec parser 154 parses the headers that follow the ESP header. Any header that follows the ESP header will be encrypted and cannot be parsed until decryption has taken place. This parsing must be completed before TCP/UDP checksums can be computed and before pad bits can be checked. The decrypted data is stored in the memory 116. To perform the TCP/UDP checksums and pad checks without having to store the frame data another time, these functions are carried out by checksum and pad check system 156 while the data is being transferred from the memory 116 to the host memory 128. In addition to the on-board IPSec processing and TCP segmentation highlighted above, the network controller 102 also provides performance improvements in the execution of interrupts. Read latencies are large when a host processor is required to read a register from a network device. These latencies negatively impact system performance. In particular, as the host processor clock speed continues to increase, the disparity between the clock speed and the time it takes to get a response from a network controller over a PCI or other host bus becomes larger. Accordingly, when a host processor needs to read from a network device, the processor must wait a greater number of clock cycles, thereby resulting in opportunity loss.

The network interface 102 avoids many read latencies by replacing read operations with write operations. Write operations are not as problematic because they can take place without involving the processor 112. Thus when write information is sent to a FIFO, as long as the writes are in small bursts, the network controller 102 can take the necessary time to execute the writes without negatively loading the processor. To avoid read operations during a transmit operation, the driver creates a descriptor 192 in the system memory 128 and then writes a pointer to that descriptor to the register 132 of the network controller 102. The DMU 130 of the controller 102 sees the contents in the register 132 and reads the necessary data directly from the system memory 128 without further intervention of the processor 112. For receive operations, the driver software 190 identifies empty buffers 194 in the system memory 128, and writes a corresponding entry to the register 132. The descriptor management unit 130 writes to pointers in the transmit descriptor rings to indicate which transmit descriptors 192 have been processed and to pointers in the status rings to indicate which receive buffers 194 have been used.

Unlike conventional architectures that require a host processor to read an interrupt register in the network controller, the present invention generates and employs a control status block (CSB) 196 located in a predetermined region of the system memory 128 (e.g., a location determined upon initialization). The network controller 102 writes to the CSB 196 any register values the system needs. More particularly, after a frame has been completely processed, prior to generating an interrupt, the network controller 102 writes a copy of the interrupt register to the CSB 196. Then the controller 102 asserts the interrupt; thus when the host processor 112 sees the interrupt in the register 132, the received data is already available in the receive data buffer 194.

Various operational and structural details of the exemplary network interface controller 102 are hereinafter provided in conjunction with the figures. In particular, details of the descriptor management features, transmit data frame segmentation and checksumming, as well as security processing are illustrated and described below in greater detail to facilitate an understanding of the present invention in the context of the exemplary controller 102.

Descriptor Management

Figure 5A:
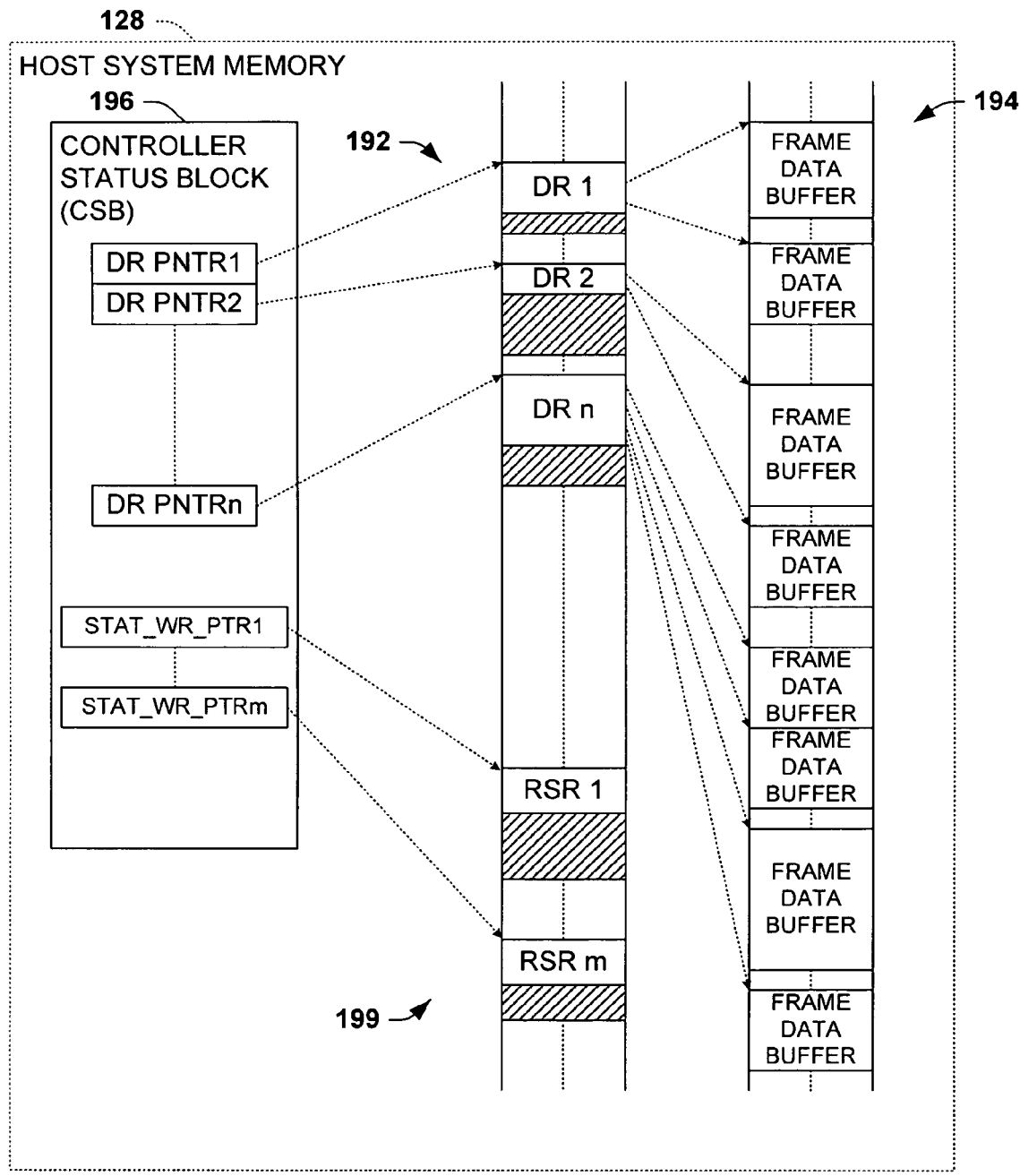
FIG. 5A is a schematic diagram illustrating a control status block in a host system memory with pointers to descriptor rings and receive status rings in the host system of FIG. 2.
Figure 5B:
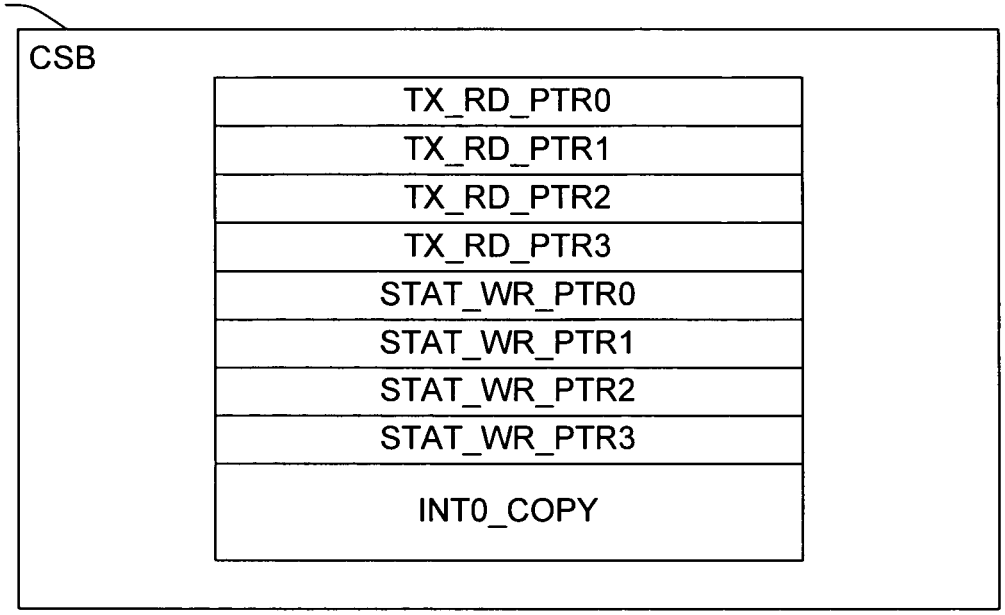
FIG. 5B is a schematic diagram illustrating a controller status block in the host memory of the host system of FIG. 2.
Figure 5C:
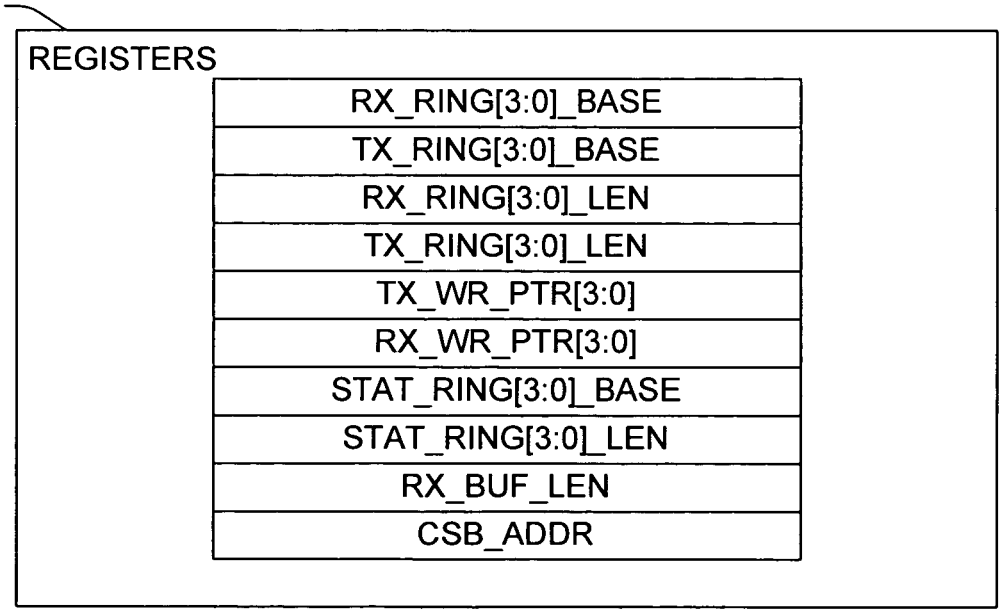
FIG. 5C is a schematic diagram illustrating descriptor management unit registers in the network interface system of FIG. 2.
Figure 5D:
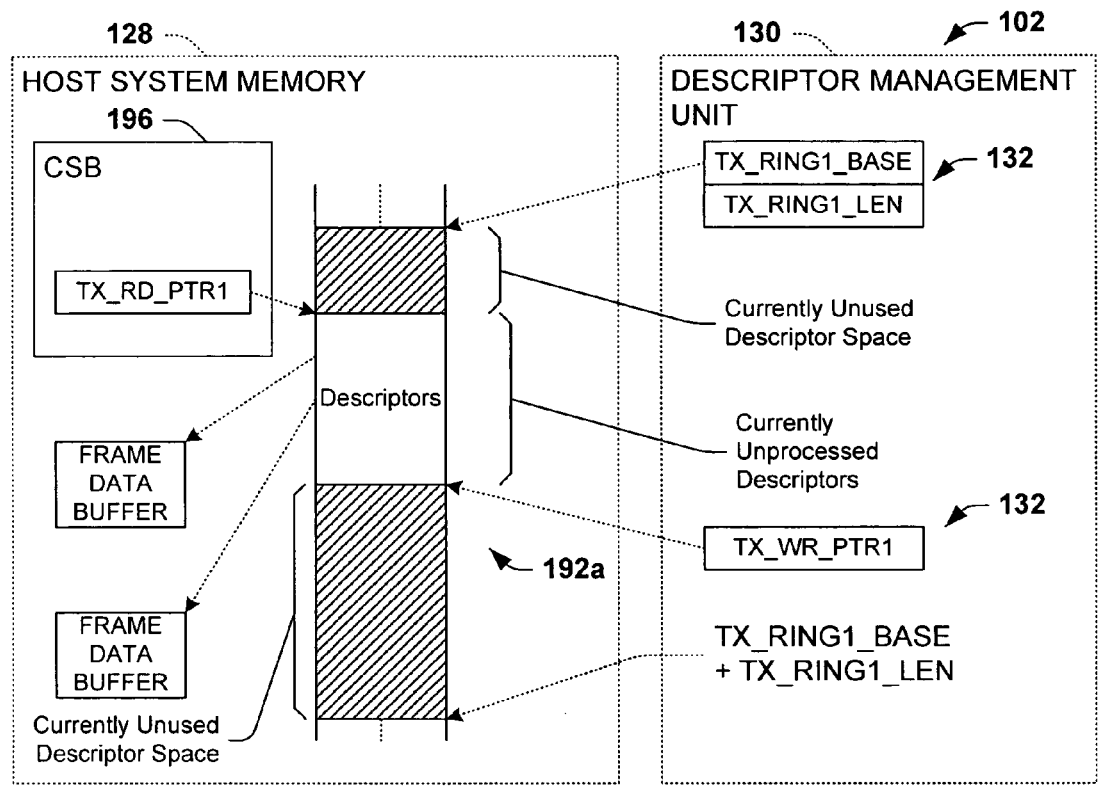
FIG. 5D is a schematic diagram illustrating an exemplary transmit descriptor ring in host system memory and pointer registers in a descriptor management unit of the network interface system of FIG. 2.
Figure 5E:
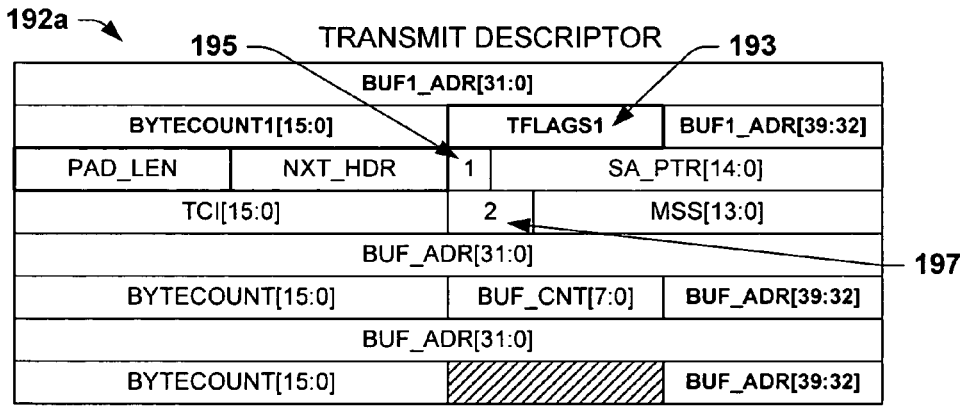
FIG. 5E is a schematic diagram illustrating an exemplary transmit descriptor in the network interface system of FIG. 2.
Figure 5F:
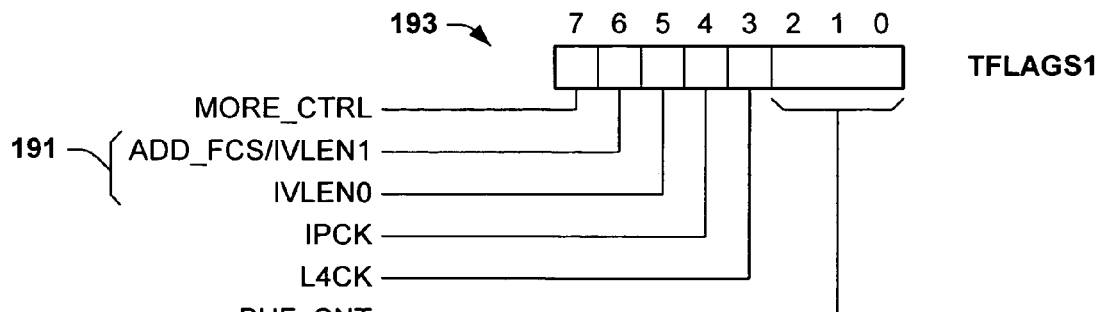
FIG. 5F is a schematic diagram illustrating a transmit flags byte in the transmit descriptor of FIG. 5E.
Figures 5G, 5H:
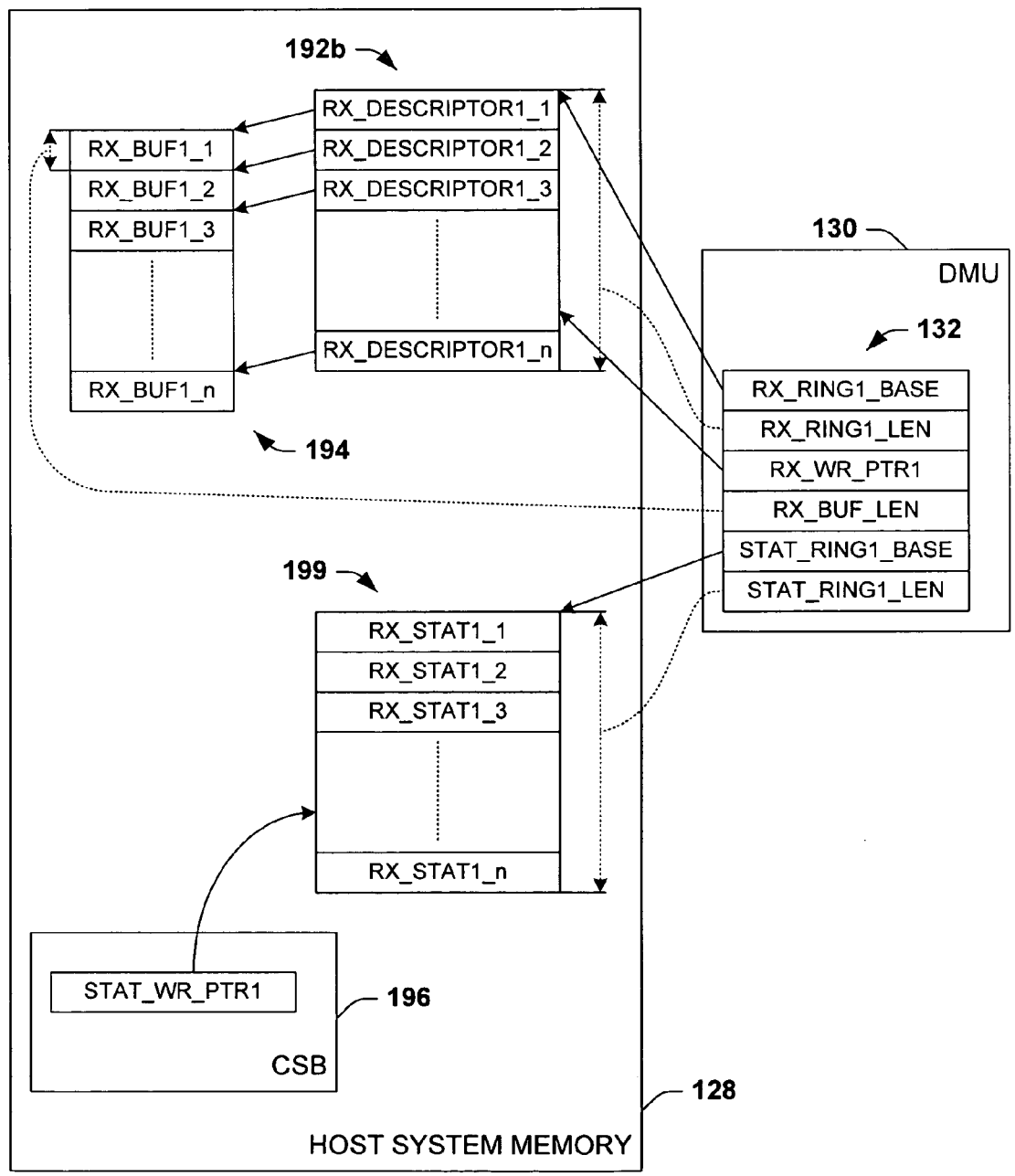
FIG. 5G is a schematic diagram illustrating an exemplary receive descriptor in the network interface system of FIG. 2.
FIG. 5H is a schematic diagram illustrating an exemplary receive descriptor ring and receive status ring in host system memory, as well as pointer registers in the descriptor management unit of the network interface system of FIG. 2.
Figure 5I:
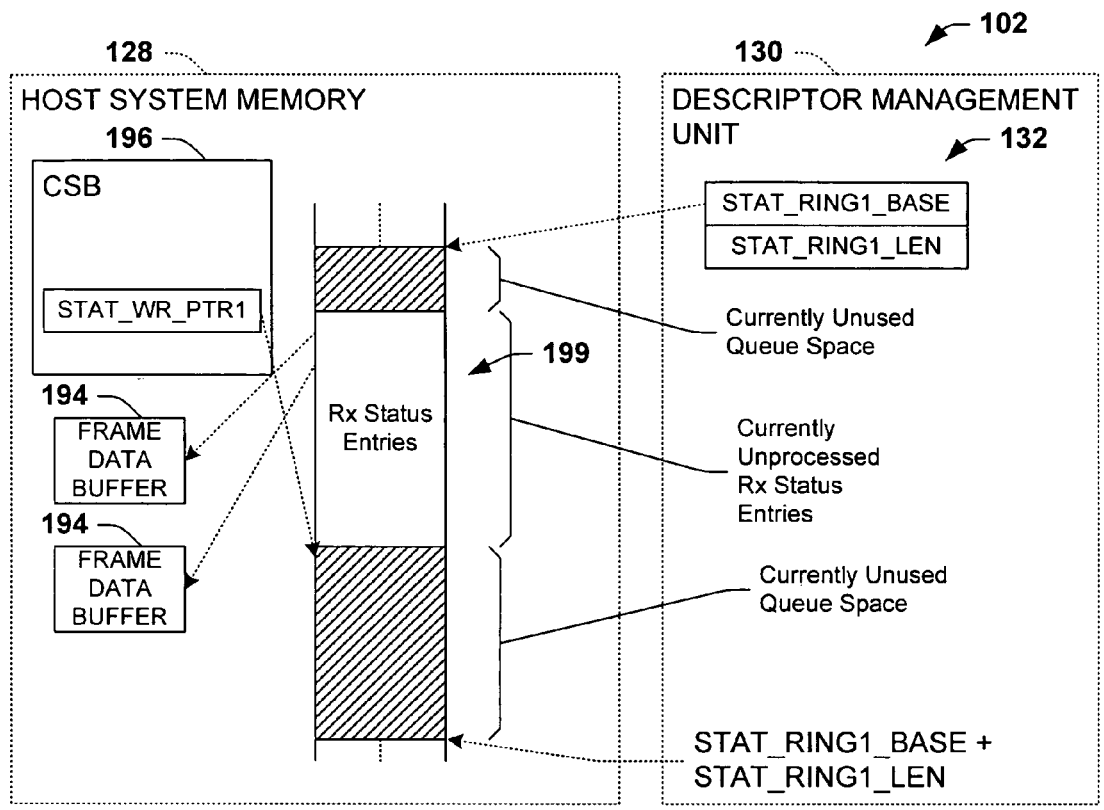
FIG. 5I is a schematic diagram illustrating an exemplary receive status ring in host system memory and pointer registers in the descriptor management unit in the network interface system of FIG. 2.
Figure 5J:
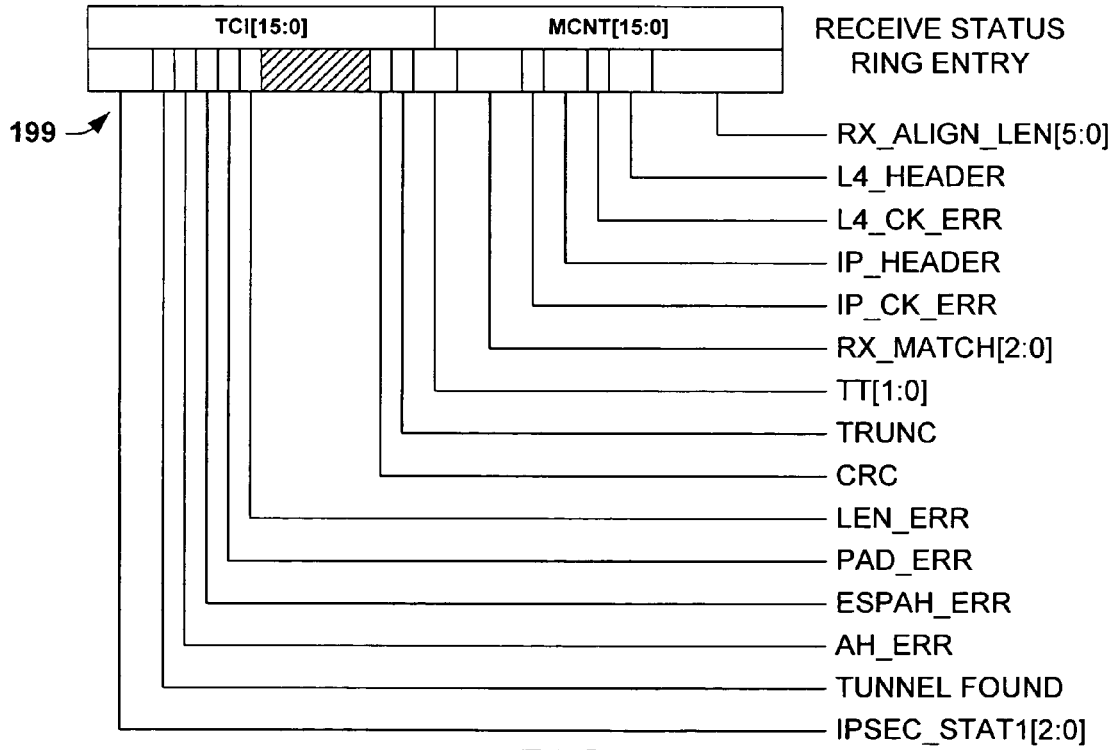
FIG. 5J is a schematic diagram illustrating an exemplary receive status ring entry in the host system memory.

Referring now to FIGS. 2, 4, and 5A-5J, further details of the descriptors 192 and the operation of the exemplary controller 102 are illustrated and described below. FIG. 5A illustrates the host memory 128, including the controller status block (CSB) 196, frame data buffers 194, an integer number 'n' descriptor rings DR1 . . . DRn for transmit and receive descriptors 192, and an integer number 'm' receive status rings 199 RSR1 . . . RSRm. The transmit and receive descriptors 192 are stored in queues referred to herein as descriptor rings DR, and the CSB 196 includes descriptor ring pointers DR_PNTR1 . . . DR_PNTRn to the descriptor rings DR. In the exemplary controller 102, four transmit descriptor rings are provided for transmitted frames and four receive descriptor rings are provided for received frames, corresponding to four priorities of network traffic. Each descriptor ring DR in this implementation is treated as a continuous ring structure, wherein the first memory location in the ring is considered to come just after the last memory location thereof. FIG. 5B illustrates pointers and other contents of the exemplary CSB 196 and FIG. 5C illustrates various pointer and length registers 132 in the controller 102. FIG. 5D illustrates further details of an exemplary transmit descriptor ring, FIG. 5H and FIG. 5I show details relating to exemplary receive descriptor and receive status rings, respectively. FIGS. 5E and 5F illustrate an exemplary transmit descriptor, FIG. 5G illustrates an exemplary receive descriptor, and FIG. 5J illustrates an exemplary receive status ring entry.

As shown in FIG. 5A, the descriptors 192 individually include pointers to one or more data buffers 194 in the system memory 128, as well as control information, as illustrated in FIGS. 5E-5G. Synchronization between the controller 102 and the software driver 190 is provided by pointers stored in the controller registers 132, pointers stored in the CSB 196 in the system memory 128, and interrupts. In operation, the descriptor management unit 130 in the controller 102 reads the descriptors 192 via the DMA controller 126 of the bus interface 104 in order to determine the memory location of the outgoing frames to be transmitted (e.g., in the data buffers 194) and where to store incoming frames received from the network 108. The CSB 196 is written by the network controller 102 and read by the driver 190 in the host processor 112, and the descriptor management registers 132 are written by the driver 190 and read by the descriptor management unit 130 in the controller 102. The exemplary descriptor system generally facilitates information exchange regarding transmit and receive operations between the software driver 190 and the controller 102.

Referring now to FIG. 5B, the exemplary CSB 196 includes pointers into the descriptor and status rings, as well as a copy of the contents of the controller's interrupt register. Transmit pointers TX_RD_PTR0 through TX_RD_PTR3 are descriptor read pointers corresponding to transmit priorities 3 through 0, respectively, which point just beyond the last 64-bit quad word (QWORD) that the controller 102 has read from the corresponding priority transmit descriptor ring. Receive status pointers STAT_WR_PTR0 through STAT_WR_PTR3 are descriptor write pointers corresponding to transmit priorities 3 through 0, respectively, which point just beyond the last QWORD that the controller 102 has written to the corresponding priority receive status ring. The CSB 196 also comprises an interrupt zero register copy INT0_COPY, which is a copy of the contents of an interrupt 0 register in the controller 102.

FIG. 5C illustrates registers 132 related to the descriptor management unit 130 in the controller 102. Transmit descriptor base pointers TX_RING[3:0]_BASE include the memory addresses of the start of the transmit descriptor rings of corresponding priority, and the lengths of the transmit descriptor rings are provided in TX_RING[3:0]_LEN registers. Transmit descriptor write pointers are stored in registers TX_WR_PTR[3:0], where the driver software 190 updates these registers to point just beyond the last QWORD that the driver has written to the corresponding transmit descriptor ring. Receive descriptor base pointers RX_RING[3:0]_BASE include the memory address (e.g., in host memory 128) of the start of the receive descriptor rings of corresponding priority, and the lengths of these receive descriptor rings are provided in RX_RING[3:0]_LEN registers. Receive descriptor write pointers RX_WR_PTR[3:0] are updated by the driver 190 to point just beyond the last QWORD that the driver has written to the corresponding receive descriptor ring. Receive status ring base pointer registers STAT_RING[3:0]_BASE indicate the memory address of the receive status rings, and STAT_RING[3:0]_BASE indicate the lengths of the corresponding receive status rings 199 in memory 128. RX_BUF_LEN indicates the number of QWORDS of the receive data buffers 194, where all the receive data buffers 194 are of the same length, and CSB_ADDR indicates the address of the CSB 196 in the host memory 128.

To further illustrate descriptor management operation in data transmission, FIG. 5D illustrates the host memory 128 and the descriptor management unit 130, including an exemplary transmit descriptor ring in the host memory 128 and the corresponding descriptor registers 132 in the descriptor management unit 130 of the controller 102. In addition, FIGS. 5E and 5F illustrate an exemplary transmit descriptor 192a and control flags thereof, respectively. In the transmit descriptor 102 of FIG. 5E, BUF1_ADR[39:0] includes an address in the host memory 128 of the first data buffer 194 associated with the descriptor 192a. The descriptor 192a also includes transmit flags (TFLAGS1, FIGS. 5E and 5F) 193, which include a MORE_CTRL bit to indicate inclusion of a second 64-bit control word with information relating to virtual local area network (VLAN) operation and TCP segmentation operation. An ADD_FCS/IVLEN1 bit and an IVLEN0 bit 191 are used for controlling FCS generation in the absence of IPsec processing, or to indicate the length of an encapsulation security protocol (ESP) initialization vector (IV) when IPsec security and layer 4 processing are selected. An IPCK bit is used to indicate whether the controller 102 generates a layer 3 (IP layer) checksum for transmitted frames, and an L4CK flag bit indicates whether the controller 102 generates a layer 4 (e.g., TCP, UDP, etc.) checksum. Three buffer count bits BUF_CNT indicate the number of data buffers 194 associated with the descriptor 192a, if less than 8. If more than 8 data buffers 194 are associated with the descriptor 192a, the buffer count is provided in the BUF_CNT[7:0] field of the descriptor 192a.

A BYTECOUNT1[15:0] field in the descriptor 192a indicates the length of the first data buffer 194 in bytes. A PAD_LEN field includes a pad length value from an ESP trailer associated with the frame and a NXT_HDR field provides next header information (protocol data for IPv4) from the ESP trailer if the MORE_CTRL bit is set. Following the NXT_HDR field, an ESP_AUTH bit 195 indicates whether the frame includes an authentication data field in the ESP trailer, and a security association (SA) pointer field SA_PTR[14:0] points to an entry in the external SA memory 140 (FIG. 2) that corresponds to the frame. A two bit VLAN tag control command field TCC[1:0] 197 includes a command which causes the controller 102 to add, modify, or delete a VLAN tag or to transmit the frame unaltered, and a maximum segment size field MSS[13:0] specifies the maximum segment size that the TCP segmentation hardware of the controller 102 will generate for the frame associated with the descriptor 192a. If the contents of the TCC field are 10 or 11, the controller 102 will transmit the contents of a tag control information field TCI[15:0] as bytes 15 and 16 of the outgoing frame. Where the frame data occupies more than one data buffer 194, one or more additional buffer address fields BUF_ADR[39:0] are used to indicate the addresses thereof, and associated BYTECOUNT[15:0] fields are used to indicate the number of bytes in the extra frame buffers 194.

When the network software driver 190 writes a descriptor 192 to a descriptor ring, it also writes to a descriptor write pointer register 132 in the descriptor management unit registers 132 to inform the controller 102 that new descriptors 192 are available. The value that the driver writes to a given descriptor management register 132 is a pointer to a 64-bit word (QWORD) in the host memory 128 just past the descriptor 192 that it has just written, wherein the pointer is an offset from the beginning of the descriptor ring measured in QWORDs. The controller 102 does not read from this offset or from anything beyond this offset. When a transmit descriptor write pointer register (e.g., DMU register 132, such as TX_WR_PTR1 in FIG. 5D) has been written, the controller 102 starts a transmission process if a transmission is not already in progress. When the transmission process begins, it continues until no unprocessed transmit descriptors 192 remain in the transmit descriptor rings. When the controller 102 finishes a given transmit descriptor 192, the controller 102 writes a descriptor read pointer (e.g., pointer TX_RD_PTR1 in FIG. 5D) to the CSB 196.

At this point, the descriptor read pointer TX_RD_PTR1 points to the beginning of the descriptor 192 that the controller 102 will read next. The value of the descriptor 192 is the offset in QWORDs of the QWORD just beyond the end of the last descriptor that has been read. This pointer TX_RD_PTR1 thus indicates to the driver 190 which part of descriptor space it can reuse. The driver 190 does not write to the location in the descriptor space that the read pointer points to or to anything between that location and 1 QWORD before the location that the descriptor write pointer TX_WR_PTR1 points to. When the descriptor read pointer TX_RD_PTR1 is equal to the corresponding descriptor write pointer TX_WR_PTR1, the descriptor ring is empty. To distinguish between the ring empty and ring full conditions, the driver 190 insures that there is always at least one unused QWORD in the ring. In this manner, the transmit descriptor ring is full when the write pointer TX_WR_PTR1 is one less than the read pointer TX_RD_PTR1 modulo the ring size.

Referring also to FIG. 5G, an exemplary receive descriptor 192b is illustrated, comprising a pointer BUF_ADR[39:0] to a block of receive buffers 194 in the host system memory 128, and a count field BUF_MULT[7:0] indicating the number of buffers 194 in the block, wherein all the receive buffers 194 are the same length and only one buffer is used for each received frame in the illustrated example. If the received frame is too big to fit in the buffer 104, the frame is truncated, and a TRUNC bit is set in the corresponding receive status ring entry 199. FIG. 5H illustrates an exemplary receive descriptor ring comprising an integer number n receive descriptors 192b for storing addresses pointing to n receive data buffers 194 in the host memory 128. The registers 132 in the descriptor management unit 130 of the controller 102 include ring base and length registers (RX_RING1_BASE and RX_RING1_LEN) corresponding to the receive descriptor ring, as well as a receive write pointer register (RX_WR_PTR1) including an address of the next unused receive descriptor 192b in the illustrated descriptor ring, and a receive buffer length register (RX_BUF_LEN) including the length of all the buffers 194. The descriptor management unit 130 also has registers 132 (STAT_RING1_BASE and STAT_RING1_LEN) related to the location of the receive status ring having entries 199 corresponding to received data within one or more of the buffers 194. The control status block 196 in the host memory 128 also includes a register STAT_WR_PTR1 whose contents provide the address in the receive status ring of the next unused status ring location, wherein the receive status ring is considered empty if STAT_WR_PTR1 equals RX_WR_PTR1.

FIGS. 5I and 5J illustrate further details of an exemplary receive status ring 199 and an entry therefor, respectively. The exemplary receive status ring entry of FIG. 5J includes VLAN tag control information TCI[15:0] copied from the receive frame and a message count field MCNT[15:0] indicating the number of bytes received which are copied in the receive data buffer 194. A three bit IPSEC_STAT1[2:0] field indicates encoding status from the IPsec security system 124 and a TUNNEL_FOUND bit indicates that a second IP header was found in the received data frame. An AH_ERR bit indicates an authentication header (AH) failure, an ESPAH_ERR bit indicates an ESP authentication failure, and a PAD_ERR bit indicates an ESP padding error in the received frame. A CRC bit indicates an FCS or alignment error and a TRUNC bit indicates that the received frame was longer than the value of the RX_BUF_LEN register 132 (FIG. 5C above), and has been truncated. A VLAN tag type field TT[1:0] indicates whether the received frame is untagged, priority tagged, or VLAN tagged, and an RX_MATCH[2:0] field indicates a receive address match type. An IP_CK_ERR bit indicates an IPv4 header checksum error, and an IP header detection field IP_HEADER[1:0] indicates whether an IP header is detected, and if so, what type (e.g., IPv4 or IPv6). An L4_CK-ERR bit indicates a layer 4 (e.g., TCP or UDP) checksum error in the received frame and a layer 4 header detection field L4_HEADER indicates the type of layer 4 header detected, if any. In addition, a receive alignment length field RCV_ALIGN_LEN[5:0] provides the length of padding inserted before the beginning of the MAC header for alignment.

As shown in FIGS. 5H and 5I, in receive operation, the controller 102 writes receive status ring write pointers STAT_WR_PTR[3:0] (FIG. 5B) to the CSB 196. The network driver software 190 uses these write pointers to determine which receive buffers 194 in host memory 128 have been filled. The receive status rings 199 are used to transfer status information about received frames, such as the number of bytes received and error information, wherein the exemplary system provides four receive status rings 199, one for each priority. When the controller 102 receives an incoming frame from the network 108, the controller 102 uses the next receive descriptor 192 from the appropriate receive descriptor ring to determine where to store the frame in the host memory 128.

Once the received frame has been copied to system memory 128, the controller 102 writes receiver status information to the corresponding receive status ring 199. Synchronization between controller 102 and the driver software 190 is provided by the receive status write pointers (STAT_WR_PTR [3:0]) in the CSB 196. These pointers STAT_WR_PTR[3:0] are offsets in QWORDs from the start of the corresponding ring.

When the controller 102 finishes receiving a frame from the network 108, it writes the status information to the next available location in the appropriate receive status ring 199, and updates the corresponding receive status write pointer STAT_WR_PTR. The value that the controller 102 writes to this location is a pointer to the status entry in the ring that it will write to next. The software driver 190 does not read this entry or any entry past this entry. The exemplary controller 102 does not have registers that point to the first unprocessed receive status entry in each ring. Rather, this information is derived indirectly from the receive descriptor pointers RX_WR_PTR. Thus, when the software driver 190 writes to one of the RX_WR_PTR registers 132 (FIG. 5C) in the controller 102, the driver 190 ensures that enough space is available in the receive status ring 199 for the entry corresponding to this buffer 104.

Transmit Data Frames

Figure 6A:
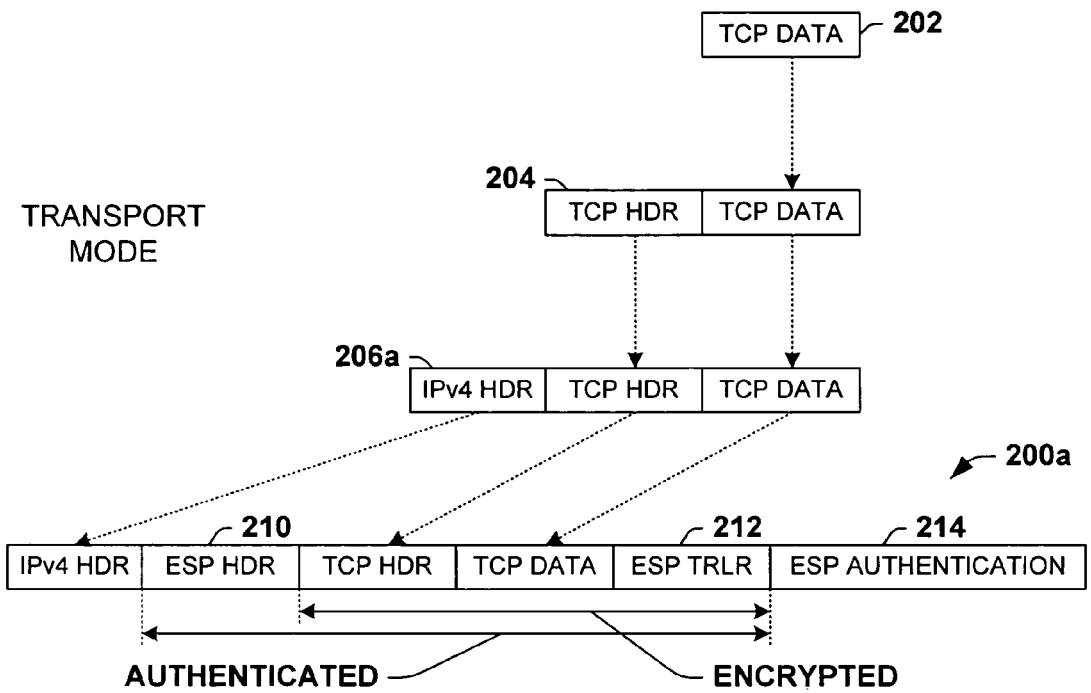
FIGS. 6A and 6B are schematic diagrams illustrating outgoing data from TCP through transport mode ESP processing for IPv4 and IPv6, respectively.
Figure 6B:
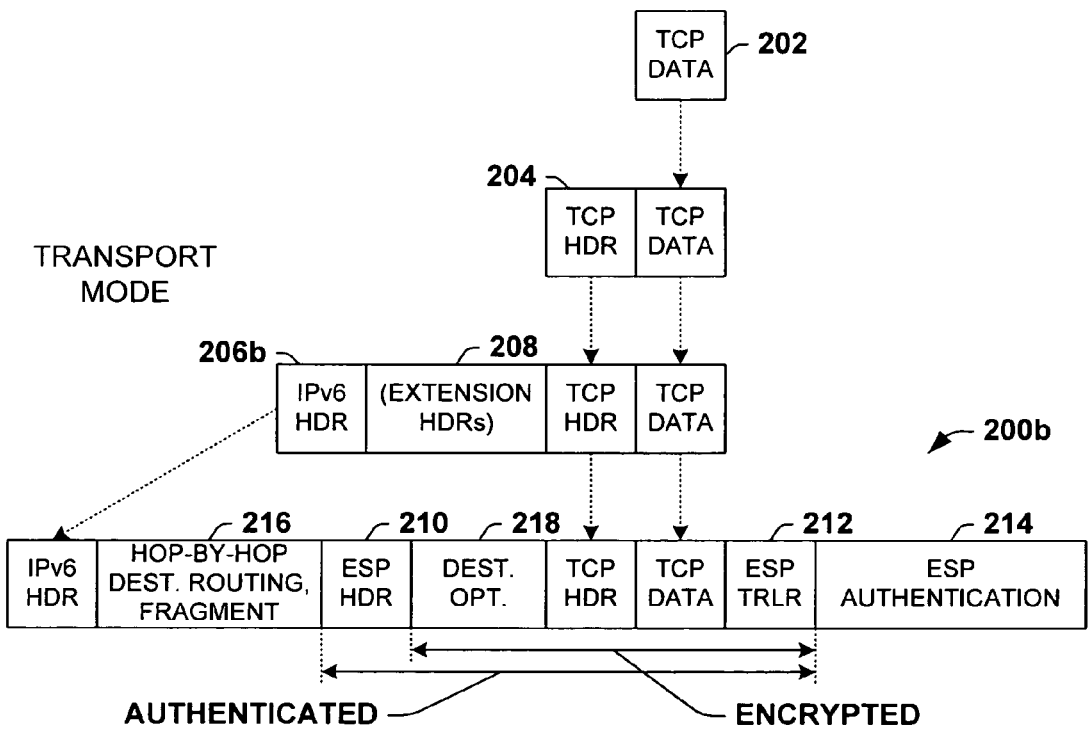
Figure 6C:
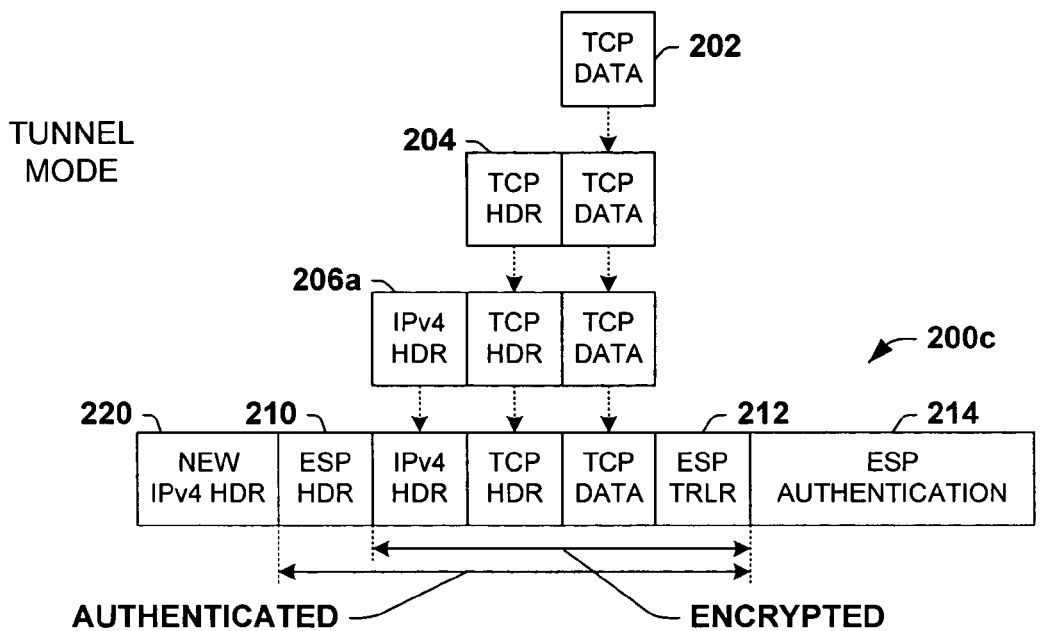
FIGS. 6C and 6D are schematic diagrams illustrating outgoing data from TCP through tunnel mode ESP processing for IPv4 and IPv6, respectively.
Figure 6D:
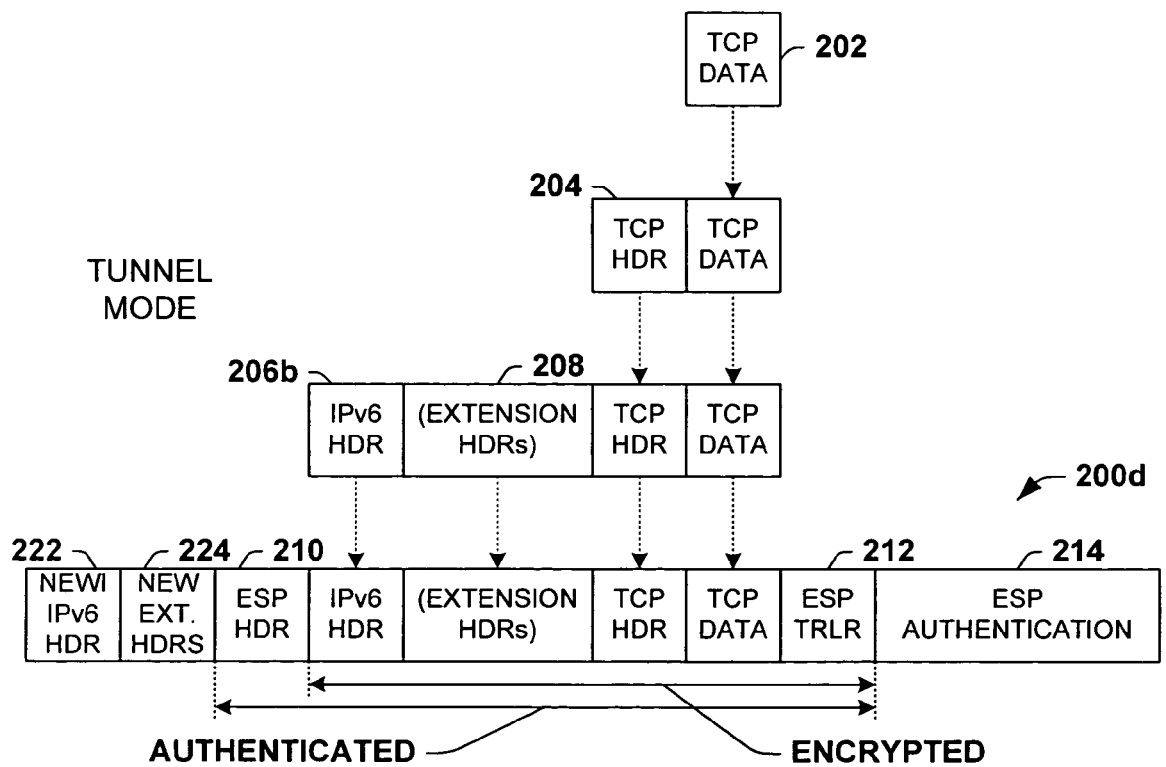

Referring now to FIGS. 2-4 and 6A-6E, the controller 102 transmits frames 200 from the data buffers 194 in host memory 128 using the transmit descriptors 192 described above. When an application software program 184 running in the host processor 112 needs to send a packet of data or information to another computer or device on the network 108, the packet is provided to the operating system layer 4 and 3 software (e.g., TCP layer software 186 and IP software 188 in FIG. 4). These software layers construct various headers and trailers to form a transmit frame 200. The network interface driver software 190 then assembles the frame 200, including one or more headers and the data packet, into the host memory data buffers 194 and updates the descriptors and descriptor management unit registers 132 in the controller 102 accordingly. The assembled frame in the data buffers 194 includes layer 3 and layer 4 headers and corresponding checksums (e.g., IP and TCP headers and checksums), as well as a MAC header. FIGS. 6A and 6C schematically illustrate the formation of transmit frames 200a and 200c using layer 4 TCP and layer 3 interne protocol version 4 (IPv4) for transport and tunnel modes, respectively, and FIGS. 6B and 6D schematically illustrate the formation of transmit frames 200b and 200d using IPv6 for transport and tunnel modes, respectively. However, the invention is not limited to TCP/IP implementations, wherein other protocols may be used. For example, the exemplary controller 102 may also be used for transmission and receipt of data using user data gram protocol (UDP) layer 4 software.

In FIGS. 6A-6D, the original data packet from the application software 184 is provided to the TCP layer 186 as TCP data 202. The TCP layer 186 stores the TCP data 202 in host memory 128 and creates a TCP header 204. The TCP data 202 and TCP header (e.g., or pointers thereto) are provided to the layer 3 software (e.g., IP layer 188 in this example). The IP layer 188 creates an IP header 206 (e.g., IPv4 headers 206a in FIGS. 6A and 6C, or IPv6 headers 206b in FIGS. 6B and 6D). For IPv6 (FIGS. 6B and 6D), the IP layer 188 may also create optional extension headers 208.

Where transmit security processing is to be employed, including ESP encryption and authentication, the IP layer 188 also creates an ESP header 210, and ESP trailer 212, and an ESP authentication field 214 for IPv4 (FIGS. 6A and 6C). For IPv6 in transport mode (FIG. 6B), a hop-by-hop destination routing field 216 and a destination option field 218 are created by the IP layer 188. For IPv4 in tunnel mode, the IP layer 188 also creates a new IPv4 header 220. For IPv6 in tunnel mode (FIG. 6D), the IP layer 188 further creates a new IPv6 header 222 and new extension headers 224 preceding the ESP header 210.

For the frame 200a of FIG. 6A, the TCP header 204, the TCP data 202, and the ESP trailer 212 are encrypted, wherein the host software may do the encryption or the exemplary network interface controller 102 may be configured to perform the encryption. Authentication is performed across the ESP header 210 and the encrypted TCP header 204, the TCP data 202, and the ESP trailer 212. For the transport mode IPv6 frame 200b in FIG. 6B, the destination option 218, the TCP header 204, the TCP data 202, and the ESP trailer 212 are encrypted and the ESP header 210 is authenticated together with the encrypted TCP header 204, the TCP data 202, and the ESP trailer 212. In tunnel mode IPv4 example of FIG. 6C, the TCP header 204, the TCP data 202, the original IPv4 header 206a, and the ESP trailer 212 are encrypted and may then be authenticated along with the ESP header 210. For the IPv6 tunnel mode example of FIG. 6D, the TCP header 204, the TCP data 202, the ESP trailer 212, the original extension headers 208, and the original IPv6 header 206b are encrypted, with these and the ESP header 210 being authenticated.

Figure 6E:
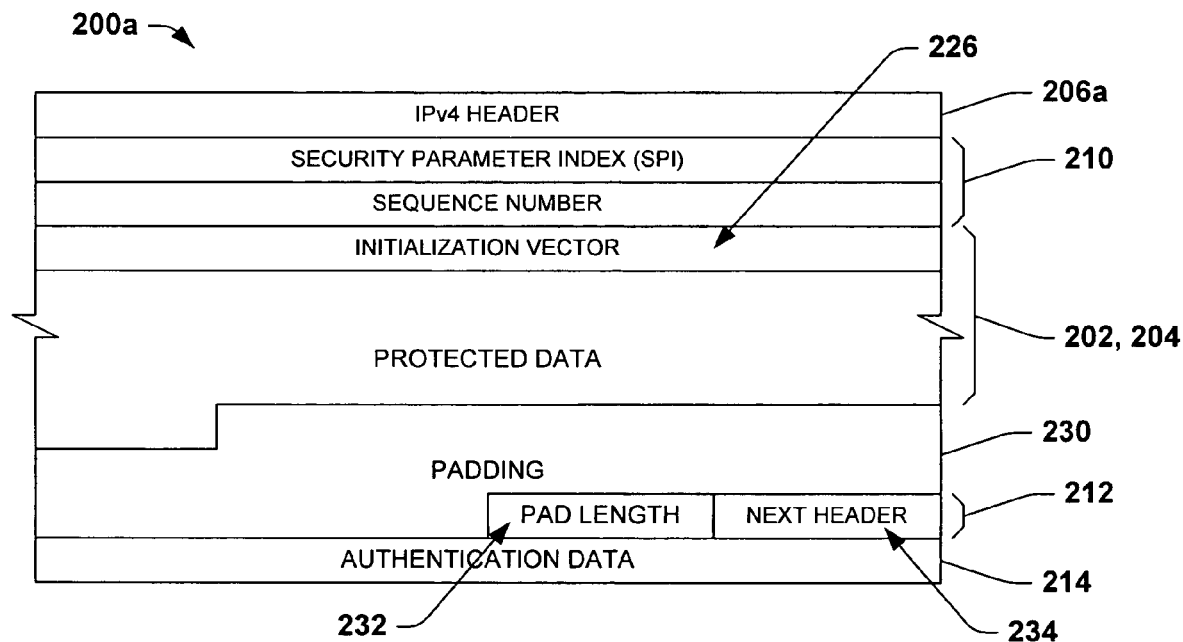
FIG. 6E is a schematic diagram illustrating exemplary ESP header, ESP trailer, authentication data, and protected data.

FIG. 6E illustrates an exemplary transmit frame 200a after creation of the ESP header 210 and trailer 212, showing further details of an exemplary ESP header 210. The ESP header 210 includes a security parameters index (SPI), which, in combination with destination IP address of the IP header 206a and the ESP security protocol uniquely identifies the security association (SA) for the frame 200a. The ESP header 210 further includes a sequence number field indicating a counter value used by the sender and receiver to identify individual frames, where the sender and receiver counter values are initialized to zero when a security association is established. The payload data of the frame 200a includes an initialization vector (IV) 226 if the encryption algorithm requires cryptographic synchronization data, as well as the TCP data 202 and TCP or other layer 4 header 204.

Padding bytes 230 are added as needed to fill the plain text data to be a multiple of the number of bytes of a cipher block for an encryption algorithm, and/or to right-align the subsequent PAD LENGTH and NEXT HEADER fields 232 and 234, respectively, in the ESP trailer 212 within a 4-byte word, thereby ensuring that the ESP authentication data 214 following the trailer 212 is aligned to a 4-byte boundary. In the ESP trailer 212, the PAD LENGTH field 232 indicates the number of PAD bytes 230, and the NEXT HEADER field 234 identifies the type of data in the protected payload data, such as an extension header in IPv6, or an upper layer protocol identifier (e.g., TCP, UDP, etc.). Where security processing is selected for the frame 200a, the IP layer 188 modifies the protocol header immediately preceding the ESP header 210 (e.g., the IPv4 header 206a in the illustrated frame 200a) to have a value (e.g., '50') in the PROTOCOL field (e.g., 'NEXT HEADER' field for IPv6) indicating that the subsequent header 210 is an ESP header.

TCP Checksumming

The exemplary controller 102 can optionally perform outgoing TCP and/or IP layer checksumming, TCP segmentation, and/or IPsec security processing. Where one or more of these functions are offloaded from the host processor 112 to the controller 102, the layer 3 software 186 may provide certain of the fields in the frame 200 (e.g., checksums, lengths, etc.) with pseudo values. With respect to TCP layer segmentation, the controller 102 can be programmed to automatically retrieve a transmit frame from the host memory 128, and where the frame is large, to break the large frame into smaller frames or frame segments which satisfy a maximum transmission unit (MTU) requirement of the network 108. The controller 102 then transmits these segments with the appropriate MAC, IP, and TCP headers. In the illustrated example, the original TCP frame 200 in the host system memory 128 is in the form of a (possibly oversized) IEEE 802.3 or Ethernet frame complete with MAC, IP, and TCP headers. In the exemplary controller 102, the IP headers 206 can be either version 4 or version 6, and the IP and TCP headers may include option fields or extension headers. The network controller 102 employs suitably modified versions of these headers in each segmented frame that it automatically generates. In the exemplary device 102, the original TCP frame can be stored in host system memory 128 in any number of the buffers 194, wherein all headers from the beginning of the frame through the TCP header 204 are stored in the first buffer 194. To enable automatic TCP segmentation for a frame 200 by the controller 102, the driver 190 in the host 112 sets the bits in the MORE_CTRL field (FIG. 5F) of the corresponding transmit descriptor 192, and also includes a valid value for the maximum segment size (MSS[13:0]) field of the descriptor 192. For all corresponding generated frames except for the last frame, the length will be the value of the MSS[13:0] field plus the lengths of the MAC header, and the IP and TCP headers 206 and 204, respectively, plus four bytes for the FCS. The length of the last frame generated may be shorter, depending on the length of the original unsegmented data.

Checksum Generation and Verification

The exemplary controller 102 may be programmed or configured to generate layer 3 (e.g., IP) and/or layer 4 (e.g., TCP, UDP, etc.) checksums for transmitted frames 200, and to automatically verify such checksums for incoming (e.g., received) frames 200. The exemplary controller 102 accommodates IP checksums as defined in RFC 791 (Internet Protocol), TCP checksums defined in RFC 793 (Transmission Control Protocol) for IPv4 frames 200e, UDP checksums as defined in RFC 768 (User Datagram Protocol) for IPv4 frames, as well as TCP and UDP checksums for IPv6 frames 200f as set forth in RFC 2460 (Internet Protocol, Version 6 Specification). With respect to IP checksums, the value for the HEADER CHECKSUM field in the IPv4 header 206a is computed in the transmit checksum system 164 as a 16-bit one's complement of a one's complement sum of all of the data in the IP header 206a treated as a series of 16-bit words. Since the TOTAL LENGTH and IDENTIFICATION fields are different for each generated segment frame 200e, the transmit checksum system 164 calculates a HEADER CHECKSUM field value for each segment frame that the controller 102 generates.

The transmit checksum system 164 may also compute TCP layer checksums for outgoing frames 200. The value for the TCP CHECKSUM field in the TCP header 204 is computed as a 16-bit one's complement of a one's complement sum of the contents of the TCP header 204, the TCP data 202, and a pseudo header that contains information from the IP header. The headers and data field are treated as a sequence of 16-bit numbers. While computing the checksum, the checksum field itself is replaced with zeros. The checksum also covers a 96 bit pseudo header (FIG. 8C or 8D) conceptually prefixed to the TCP header. This pseudo header contains the source address, the destination address, the protocol, and TCP length. If the TCP Data Field contains an odd number of bytes, the last byte is padded on the right with zeros for the purpose of checksum calculation. (This pad byte is not transmitted). To generate the TCP checksum for a segment frame 200, the transmit checksum system 164 updates the TCP SEQUENCE NUMBER field and the PSH and FIN bits of the TCP header 204 and sets the TCP CHECKSUM field to the value of the TCP CHECKSUM field from the original input frame 200. In addition, the transmit checksum system 164 initializes an internal 16-bit checksum accumulator with the length in bytes of the TCP header 204 plus the TCP data field 202, adds the one's complement sum of all of the 16-bit words that make up the modified TCP header 204 followed by the TCP data 202 for the segment to the accumulator, and stores the one's complement of the result in the TCP CHECKSUM field of the segment frame 200.

The IPCK and L4CK bits in the transmit descriptor 192a (FIG. 5F) control the automatic generation of checksums for transmitted frames 200 in the controller 102. Setting the IPCK bit causes the IP Header Checksum to be generated and inserted into the proper position in the IPv4 frame 200e of FIG. 7A. Similarly setting L4CK causes either a TCP CHECKSUM or a UDP checksum to be generated, depending on which type of layer 4 header is found in the outgoing frame 200. Since an IPv6 header 206b (FIG. 7B) does not have a header checksum field, the IPCK bit in the descriptor is ignored for IPv6 frames 200f. If TCP or UDP checksum generation is required for an outgoing frame 200, the layer 4 software 186 also puts the pseudo header checksum in the TCP or UDP checksum field. The controller 102 then replaces this value with the checksum that it calculates over the entire TCP or UDP segment, wherein the values of the generated TCP or UDP checksum differs when TCP segmentation is enabled. For TCP segmentation, the value 0 is used for the TCP TOTAL LENGTH in the pseudo header checksum calculation. For TCP or UDP checksum generation, the TCP TOTAL LENGTH value is the length of the TCP header 204 plus the length of the TCP data 202 as described in the RFCs referenced above.

The controller 102 can also be configured or programmed by the host 112 to verify checksums for received frames via the checksum and pad check system 156. When so enabled or when security (e.g., IPsec) processing is required, the controller 102 examines incoming (e.g., received) frames to identify IPv4, IPv6, TCP and UDP headers, and writes the corresponding codes to the IP_HEADER and L4_HEADER fields of the receive status ring 199 (FIG. 5J) entry to indicate which layer 3 and/or layer 4 headers it has recognized. When the device recognizes a header having a checksum, the receive checksum and pad check system 156 calculates the appropriate checksum as described in RFC 791, RFC 793, RFC 768, or RFC 2460 and compares the result with the checksum found in the received frame. If the checksums do not agree, the device sets the IP_CK_ERR and/or L4_CK_ERR bit in the corresponding receive status ring entry 199.

Although the invention has been illustrated and described with respect to one or more implementations, alterations and/or modifications may be made to the illustrated examples without departing from the spirit and scope of the appended claims. In particular regard to the various functions performed by the above described components or structures (blocks, units, engines, assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising."

What is claimed is:

1. A network interface system for interfacing a host system with a network to provide outgoing data from the host system to the network, the network interface system comprising:
a bus interface system adapted to be coupled with a host bus in the host system and to transfer outgoing data from the host system to the network interface system, the bus interface system generating read requests on the host bus to read outgoing data from the host system;
a media access control system adapted to be coupled with the network and to transfer outgoing data from the network interface system to the network;
a memory system coupled with the bus interface system and the media access control system, the memory system being adapted to store outgoing data prior to transfer of the outgoing data to the network, the memory system comprising:
a first memory that stores assembled outgoing data frames and associated control information prior to transfer of the outgoing data to the network;
an assembly memory coupled with the bus interface system and the first memory, the assembly memory storing unassembled outgoing data from the bus interface system; and
a memory control system coupled with the first memory, the assembly memory, and the bus interface system, wherein the memory control system stores the control information associated with outgoing data for which read requests have been generated but are not yet completed, wherein the memory control system transfers outgoing data from the assembly memory and associated control information to the first memory when all the outgoing data for a corresponding read request has been assembled in the assembly memory;
wherein the memory control system checks whether all outgoing data has been received for a read request associated with request information stored in a read request memory at an address given by a read request pointer value,
wherein the memory control system comprises:
the read request memory that stores request information associated with outstanding read requests for which all requested outgoing data has not yet been received from the host system;
a control word memory that stores the control information associated with outgoing data for which read requests have been generated but are not yet completed; and
a write pointer memory that stores write pointer address values indicating addresses in the assembly memory to which outgoing data received from the host system is to be written,
wherein the memory control system further comprises an assembly memory write pointer register that stores an address in the assembly memory to which a next word of outgoing data is to be transferred from the host system;
wherein the memory control system provides the contents of the assembly memory write pointer register to the bus interface system in association with a read request generated by the bus interface system to read outgoing data from the host system;

wherein the bus interface system transfers the contents of the assembly memory write pointer register to the write pointer memory at an address given by a request ID associated with the read request;

wherein the bus interface system provides the request ID to the host system as a tag value in the read request; and wherein the bus interface system increments the value in the assembly memory write pointer register based on a number of bytes of outgoing data requested in the read request, wherein the bus interface system obtains a write pointer from the write pointer memory at an address given by a tag value in a read response from the host system;

wherein the bus interface system transfers associated outgoing data received in the read response from the host system to the assembly memory beginning at an address given by the write pointer; and wherein the bus interface system updates the write pointer in the write pointer memory at an address given by the tag value based on a number of bytes of outgoing data requested in the read response, wherein the memory control system further comprises an assembly memory read pointer register that stores an address in the assembly memory from which a next word of outgoing data is to be retrieved for transfer to the first memory, and wherein when all data for a read request has been assembled in the assembly memory, the memory control system transfers the corresponding control information from the control word memory to the first memory if the read request contains the beginning of a frame and transfers the corresponding outgoing data from the assembly memory to the first memory beginning at an address given by the contents of the assembly memory read pointer, and updates the assembly memory read pointer, and wherein the memory control system further comprises:
   a frame ID counter for assigning frame IDs to outgoing data frames being obtained from the host system; and
   a read request pointer that stores an address in the read request memory of the oldest read request that has not been completed;
   wherein the request ID counter assigns a request ID to read requests generated by the bus interface system.

2. The system of claim 1, wherein to initiate a read request, the memory control system obtains a current frame ID value from the frame ID counter, increments the frame ID counter after obtaining the current frame ID value, and transfers control information associated with the read request to the control word memory at an address given by the current frame ID value.

3. The system of claim 2, wherein to initiate a read request, the memory control system obtains a current request ID value from the request ID counter, increments the request ID counter after obtaining the current request ID value, provides the current request ID value to the bus interface system, and creates a new entry in the read request memory at an address given by the current request ID value.

4. The system of claim 3, wherein if all the outgoing data has been received for a read request associated with requested information stored in the read request memory at an address given by the read request pointer value, the memory control system transfers associated control information from the control word memory to the first memory if the read request contains the beginning of a frame, transfers outgoing data associated with the read request from the assembly memory to the first memory, and updates the read request pointer value.

5. The system of claim 1, wherein if all the outgoing data has been received for a read request associated with requested information stored in the read request memory at an address given by the read request pointer value, the memory control system transfers associated control information from the control word memory to the first memory if the read request contains the beginning of a frame, transfers outgoing data associated with the read request from the assembly memory to the first memory, and updates the read request pointer value.

6. A network interface system for interfacing a host system with a network to provide outgoing data from the host system to the network, the network interface system comprising:
   a bus interface system adapted to be coupled with a host bus in the host system and to transfer outgoing data from the host system to the network interface system, the bus interface system generating read requests on the host bus to read outgoing data from the host system;
   a media access control system adapted to be coupled with the network and to transfer outgoing data from the network interface system to the network;
   a memory system coupled with the bus interface system and the media access control system, the memory system being adapted to store outgoing data prior to transfer of the outgoing data to the network, the memory system comprising:
      a first memory that stores assembled outgoing data frames and associated control information prior to transfer of the outgoing data to the network;
      an assembly memory coupled with the bus interface system and the first memory, the assembly memory storing unassembled outgoing data from the bus interface system; and
      a memory control system coupled with the first memory, the assembly memory, and the bus interface system, wherein the memory control system stores the control information associated with outgoing data for which read requests have been generated but are not yet completed, wherein the memory control system transfers outgoing data from the assembly memory and associated control information to the first memory when all the outgoing data for a corresponding read request has been assembled in the assembly memory;
wherein the memory control system checks whether all outgoing data has been received for a read request associated with request information stored in a read request memory at an address given by a read request pointer value,
   wherein the memory control system comprises:
      the read request memory that stores request information associated with outstanding read requests for which all requested outgoing data has not yet been received from the host system;
      a control word memory that stores the control information associated with outgoing data for which read requests have been generated but are not yet completed; and
      a write pointer memory that stores write pointer address values indicating addresses in the assembly memory to which outgoing data received from the host system is to be written, and
   wherein the memory control system further comprises:
      a frame ID counter for assigning frame IDs to outgoing data frames being obtained from the host system;

a request ID counter for assigning a request ID to read requests generated by the bus interface system; and a read request pointer that stores an address in the read request memory of the oldest read request that has not been completed.

7. The system of claim 6, wherein to initiate a read request, the memory control system obtains a current frame ID value from the frame ID counter, increments the frame ID counter after obtaining the current frame ID value, and transfers control information associated with the read request to the control word memory at an address given by the current frame ID value.

8. The system of claim 7, wherein to initiate a read request, the memory control system obtains a current request ID value from the request ID counter, increments the request ID counter after obtaining the current request ID value, provides the current request ID value to the bus interface system, and creates a new entry in the read request memory at an address given by the current request ID value.

9. The system of claim 8, wherein if all the outgoing data has been received for a read request associated with requested information stored in the read request memory at an address given by the read request pointer value, the memory control system transfers associated control information from the control word memory to the first memory if the read request contains the beginning of a frame, transfers outgoing data associated with the read request from the assembly memory to the first memory, and updates the read request pointer value.

10. The system of claim 6, wherein if all the outgoing data has been received for a read request associated with requested information stored in the read request memory at an address given by the read request pointer value, the memory control system transfers associated control information from the control word memory to the first memory if the read request contains the beginning of a frame, transfers outgoing data associated with the read request from the assembly memory to the first memory, and updates the read request pointer value.

* * * * *